(12) United States Patent
Kidouchim

(10) Patent No.: US 9,638,934 B2
(45) Date of Patent: *May 2, 2017

(54) EYEWEAR HINGE AND PROCESS FOR ASSEMBLY

(71) Applicant: Armand Kidouchim, Calabasas, CA (US)

(72) Inventor: Armand Kidouchim, Calabasas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/485,303

(22) Filed: Sep. 12, 2014

(65) Prior Publication Data

US 2016/0170230 A1    Jun. 16, 2016

Related U.S. Application Data

(63) Continuation-in-part of application No. 14/017,753, filed on Sep. 4, 2013, now Pat. No. 8,832,904.

(60) Provisional application No. 61/696,469, filed on Sep. 4, 2012.

(51) Int. Cl.
*G02C 5/22* (2006.01)

(52) U.S. Cl.
CPC ....... *G02C 5/2209* (2013.01); *G02C 2200/06* (2013.01); *G02C 2200/08* (2013.01); *G02C 2200/20* (2013.01); *Y10T 16/526* (2015.01); *Y10T 16/5401* (2015.01)

(58) Field of Classification Search
CPC ....... E05D 7/10; E05D 5/0238; E05D 5/0246; G02C 5/2218; G02C 5/2236; G02C 5/22; G02C 5/2227; G02C 5/14; G02C 5/16; G02C 5/2209; G02C 5/2254; G02C 5/2263; G02C 5/2272; G02C 5/2281; G02C 5/229; G02C 2200/06; G02C 2200/20; Y10T 16/526; Y10T 16/54038
See application file for complete search history.

(56) References Cited

U.S. PATENT DOCUMENTS

| | | | |
|---|---|---|---|
| 2,671,379 A | | 3/1954 | Eloranta |
| 3,156,756 A | | 11/1964 | Seaver |
| 3,264,678 A | | 8/1966 | Parmelee |
| 3,287,760 A | | 11/1966 | Moore |
| 3,610,460 A | | 10/1971 | Siklos et al. |
| 3,644,023 A | * | 2/1972 | Villani ................ G02C 5/2227 16/224 |

(Continued)

FOREIGN PATENT DOCUMENTS

| | | |
|---|---|---|
| EP | 0702803 A1 | 3/1996 |
| EP | 1319971 A1 | 6/2003 |

(Continued)

*Primary Examiner* — Chuck Mah
(74) *Attorney, Agent, or Firm* — Kelly & Kelley, LLP

(57) ABSTRACT

An eyewear hinge is provided for removably connecting an earpiece to a lens frame. A lens mount is attached to the lens frame and has one of a hinge receiver and a security slot or a hinge post and a security ledge. A hinge support is attached to the earpiece and has the other of the hinge receiver and the security slot or the hinge post and the security ledge. The hinge post is removably insertable into the hinge receiver and the security ledge is removably receivable in and engages with the security slot as the lens mount and hinge support pivot relative to one another.

22 Claims, 44 Drawing Sheets

(56) References Cited

U.S. PATENT DOCUMENTS

| | | | | |
|---|---|---|---|---|
| 4,428,094 | A * | 1/1984 | Emain | E05D 11/082 16/228 |
| 4,699,479 | A | 10/1987 | Metcalfe | |
| 4,968,129 | A | 11/1990 | Grendol | |
| 5,398,377 | A * | 3/1995 | Takiyama | G02C 5/2209 16/228 |
| 5,818,568 | A | 10/1998 | Onaga et al. | |
| 6,438,798 | B1 * | 8/2002 | Chene | G02C 5/2254 16/284 |
| 6,464,354 | B1 | 10/2002 | Chen et al. | |
| 6,575,570 | B2 * | 6/2003 | Mauri | G02C 5/10 16/228 |
| 6,623,115 | B1 * | 9/2003 | Kun-Yuan | G02C 5/2227 16/228 |
| 6,678,919 | B1 | 1/2004 | Sokolov et al. | |
| 6,869,180 | B1 | 3/2005 | Kidouchim | |
| 6,939,003 | B2 | 9/2005 | Kidouchim | |
| 7,029,115 | B2 | 4/2006 | Toulch | |
| 7,229,168 | B2 | 6/2007 | Kidouchim | |
| 7,422,323 | B2 | 9/2008 | Saitoh et al. | |
| 7,703,914 | B2 | 4/2010 | Maling | |
| 7,712,896 | B1 * | 5/2010 | Lee | G02C 5/22 16/228 |
| 7,794,080 | B2 | 9/2010 | Zelazowski | |
| 7,938,553 | B1 | 5/2011 | Beiner | |
| 8,177,360 | B2 | 5/2012 | Sierra et al. | |
| 8,292,427 | B2 | 10/2012 | Zelazowski | |
| 2003/0076475 | A1 | 4/2003 | Meiler | |
| 2006/0213031 | A1 * | 9/2006 | Niu | G02C 5/2227 16/228 |
| 2011/0109872 | A1 | 5/2011 | Chen | |
| 2011/0157542 | A1 | 6/2011 | Tsai | |
| 2011/0225707 | A1 | 9/2011 | Millios | |
| 2012/0062831 | A1 | 3/2012 | Sierra et al. | |
| 2013/0000077 | A1 * | 1/2013 | Thompson | G02C 5/2209 16/228 |
| 2013/0003013 | A1 | 1/2013 | Collins et al. | |
| 2013/0033675 | A1 | 2/2013 | Cheong | |
| 2013/0141689 | A1 | 6/2013 | Calilung et al. | |
| 2013/0242251 | A1 | 9/2013 | Austin | |

FOREIGN PATENT DOCUMENTS

| | | |
|---|---|---|
| EP | 1489452 A1 | 12/2004 |
| EP | 1584968 A1 | 10/2005 |
| EP | 1759235 A2 | 3/2007 |
| WO | 2013003147 A1 | 1/2013 |

* cited by examiner

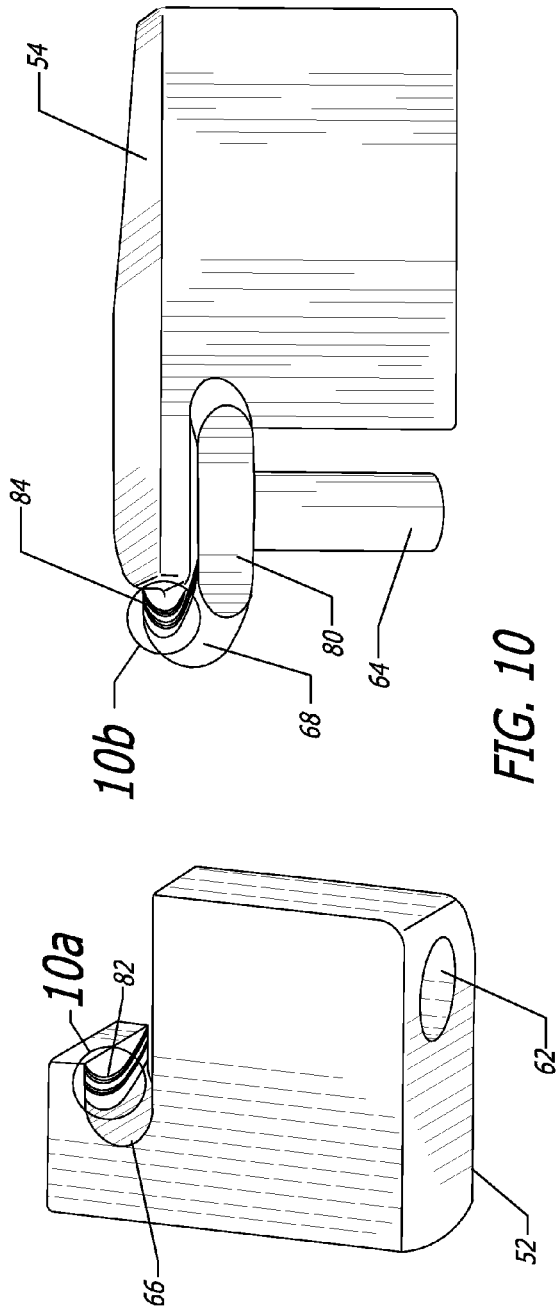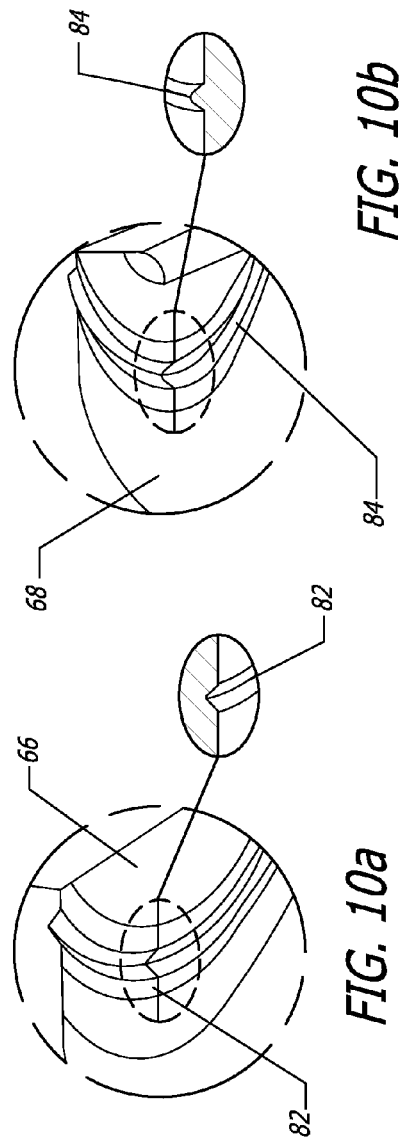
FIG. 10
FIG. 10a
FIG. 10b

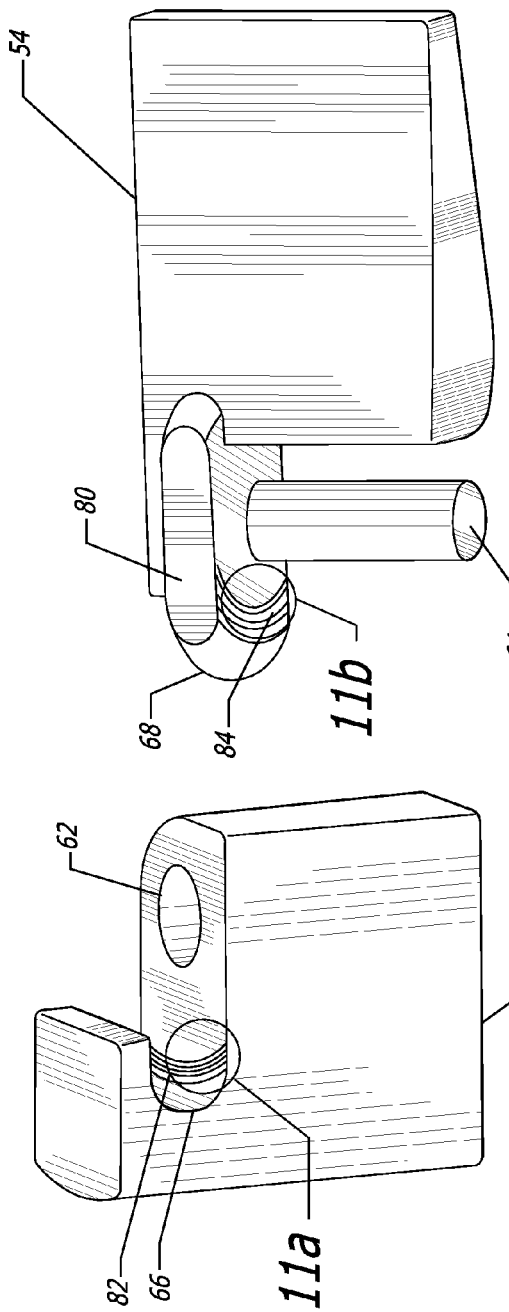
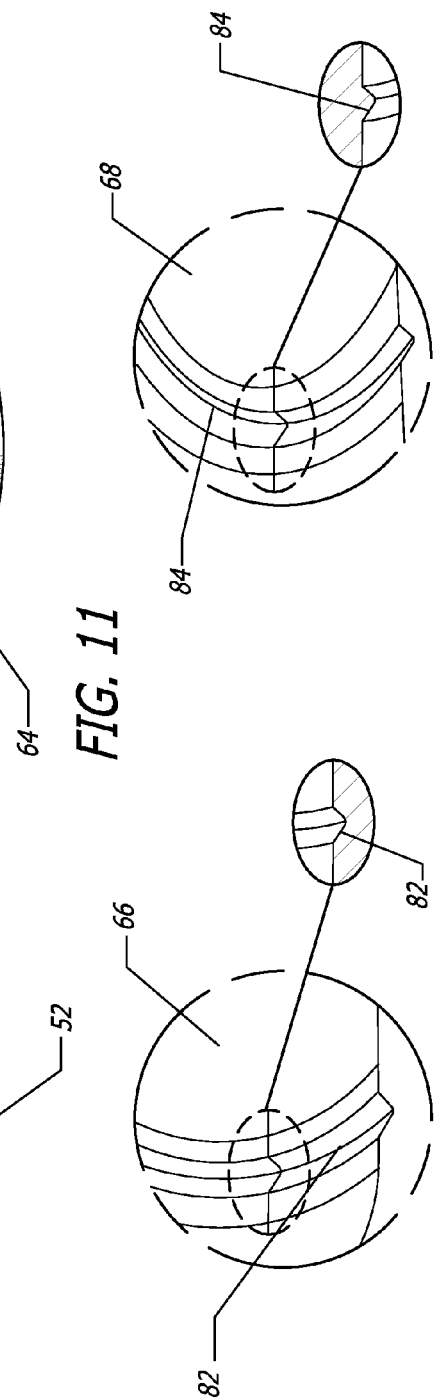
FIG. 11a
FIG. 11b
FIG. 11

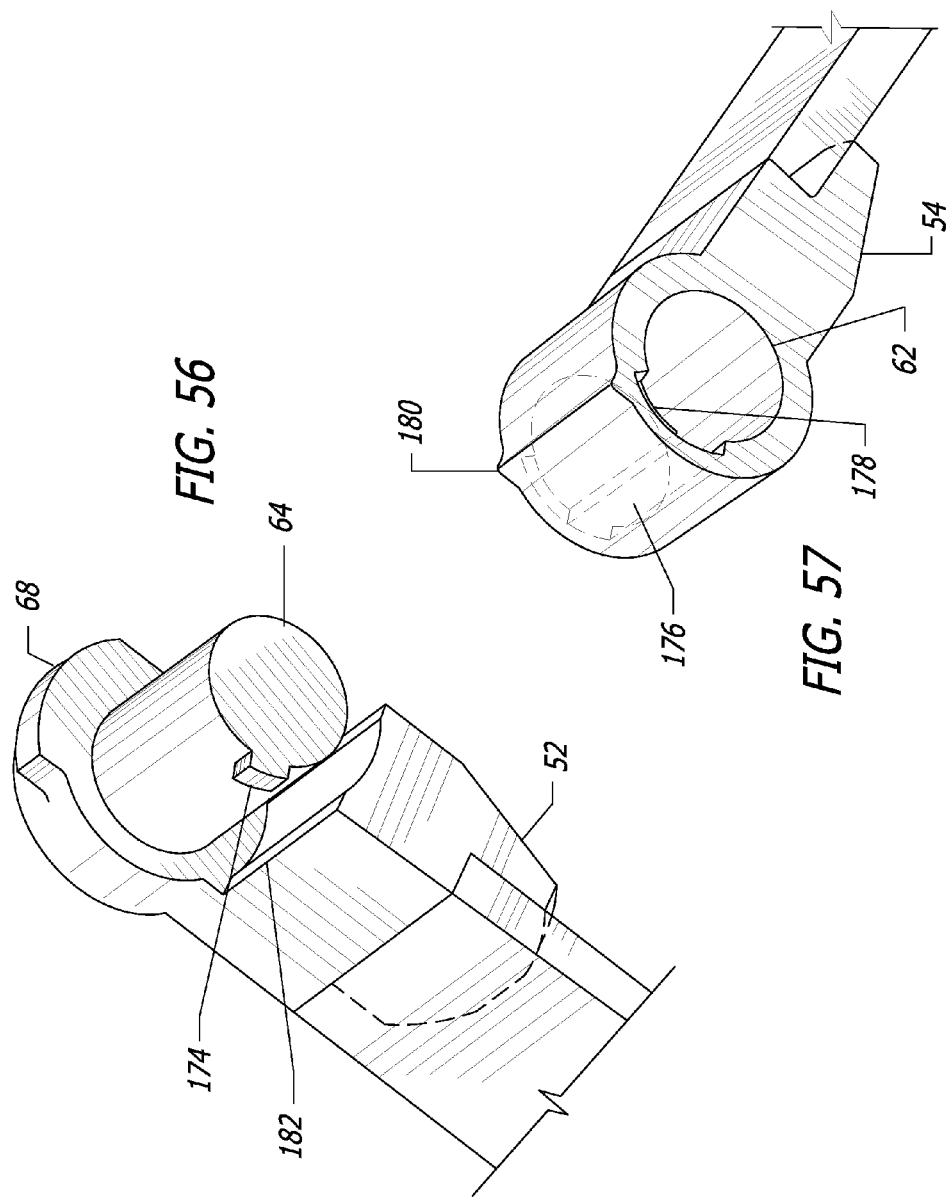

EYEWEAR HINGE AND PROCESS FOR ASSEMBLY

RELATED APPLICATIONS

This application is a continuation-in-part of U.S. patent application Ser. No. 14/017,753, filed Sep. 4, 2013, which claims priority to U.S. Provisional Patent Application Ser. No. 61/696,469, filed Sep. 4, 2012.

BACKGROUND OF THE INVENTION

The present invention is directed to an improved and more easily assembled hinge. In particular, the present invention is directed to small hinges as may be found on jewelry or small cases. More particularly, the present invention is directed to hinges found on eyeglasses connecting the earpiece to the lens frame.

A typical hinge involves two separate pieces that are joined to create a pivot point. Large hinges are commonly found on doors, gates and crates. Smaller hinges are used on brief cases, personal electronics and food containers. The smallest hinges can be found on jewelry and eyeglasses. Most such hinges typically have interweaved eyelets held together by a pin or a screw passed through the aligned eyelets. The screw provides a threaded connection and the pin typically provides a snug or friction fit connection. Other types may have a hinge receiver affixed to a first piece and a hinge post attached to a second piece, where the hinge post is simply inserted into the hinge receiver without any means of securing the same. These latter types of hinges are generally used for sturdier hinges where the weight of the second piece is sufficient to retain the hinge post in the hinge receiver.

Small hinges, such as on jewelry and eyeglasses, are usually held together by tiny screws and are very fragile. These screws frequently become overly loose and even fall out. It is particularly problematic when the screw falls out of a pair of eye glasses. If a pair of eye glasses falls apart while the wearer is operating a car, the resulting situation can be very dangerous.

Additionally, such small hinges as are found in eye glasses are very difficult to manufacture. Manufacturing eye glasses is a process that requires a large number of operations, a high level of expertise, and a lot of time. Then, if the finished pair of eye glasses later falls apart, repair is just as time consuming and difficult; especially if attempted by a lay-person.

Dealing with the tiny hinges, screws and assemblies in eye glasses will become a growing problem in the near future as augmented reality technology becomes more widely available to the public. Augmented reality technology turns a normal pair of eye glasses into a view screen for computing, telecommunications, internet browsing, and more. Processors, power supplies, and connectors for this technology will be housed in the ear pieces of a pair of glasses, thus a technology upgrade or repair will require taking the eye glasses apart and putting them back together.

Accordingly, there is a need for a hinge that can be configured for use in products, like eye glasses, that has no parts that will loosen and fall out over time. There is also a need for a hinge that is easy to assemble and disassemble, even for a person with little manufacturing training. The present invention fulfills these needs and provides other related advantages.

SUMMARY OF THE INVENTION

The present invention is directed to an eyewear hinge for removably connecting an earpiece to a lens frame. The eyewear hinge includes a lens mount and a hinge support that are removably connected to one another. The lens mount is attached to the lens frame and includes one of a hinge receiver or a hinge post. The hinge support is attached to the earpiece and includes the other of the hinge receiver or the hinge post. The hinge post is removably insertable into the hinge receiver and both are configured so as to permit the lens mount and hinge support to pivot relative to one another.

In an alternate embodiment, the eyewear hinge may also include one of a security slot and a security ledge on the lens mount. The hinge support would include the other of the security slot and the security ledge. In this embodiment, the security ledge is removably receivable in and engaged with the security slot as the lens mount and hinge support pivot relative to one another. The security ledge preferably disengages the security slot when the lens mount and hinge support are pivoted into a removal position corresponding to a discontinuity in the security ledge. The removal position corresponds to the lens mount and hinge support being pivoted beyond a closed position such that the security ledge is no longer received in or engaged with the security slot.

The eyewear hinge may further include a friction element disposed in the hinge receiver. The friction element exerts a friction force on the hinge post. The friction force exerted by the friction element restricts removal of the hinge post from the hinge receiver and pivotal movement of the hinge post relative to the hinge receiver.

Alternatively, the hinge post may include a locking lug and the hinge receiver may include a lug channel and a stop ledge. The lug channel preferably extends along a length of the hinge receiver and receives the locking lug when the hinge post is inserted into the hinge receiver. The stop ledge extends around a portion of a bottom perimeter of the hinge receiver and engages the locking lug when the hinge post is pivoted relative to the hinge receiver.

The eyewear hinge may also include a first set of parallel ledges on an exposed surface of the lens mount and a second set of parallel ledges on a mating surface of the hinge support. The first set of parallel ledges and the second set of parallel ledges are configured to engage when the hinge post is inserted in the hinge receiver. The first set of parallel ledges and the second set of parallel ledges are preferably configured to engage when the hinge post is pivoted relative to the hinge receiver. The first set of parallel ledges and the second set of parallel ledges are more preferably oriented at a slight angle relative to an orientation of the lens mount and hinge support.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 6b is a top view of the hinge support of FIG. 6a;

FIG. 10 is a perspective view of a lens mount and a hinge support illustrating threaded channels and grooves;

FIG. 10a is a close-up view of the threaded channel on the lens mount;

FIG. 10b is a close-up view of the threaded ridge on the hinge support;

FIG. 11 is an alternate view of the structures in FIG. 10 showing the threaded channels and ridges on bottom surfaces of the lens mount and hinge support;

FIG. 11a is a close-up view of the threaded channel on the lens mount of FIG. 11;

FIG. 11b is a close-up view of the threaded ridge on the hinge support of FIG. 11;

FIG. 14b is a bottom view of the lens mount of FIG. 14a;

FIG. 15b is a bottom view of the hinge support of FIG. 15a;

FIG. 21b is a bottom view of the lens mount of FIG. 21a;

FIG. 24b is a bottom view of the lens mount of FIG. 24a;

FIG. 25 is a perspective view of a hinge support for use with the lens mount of FIG. 24a;

FIG. 56 is a perspective view of a component of an alternate embodiment of the eyewear hinge of the present invention;

FIG. 57 is a perspective view of another component of the alternate embodiment of the eyewear hinge of FIG. 56;

DETAILED DESCRIPTION OF THE PREFERRED EMBODIMENTS

Figure 1:
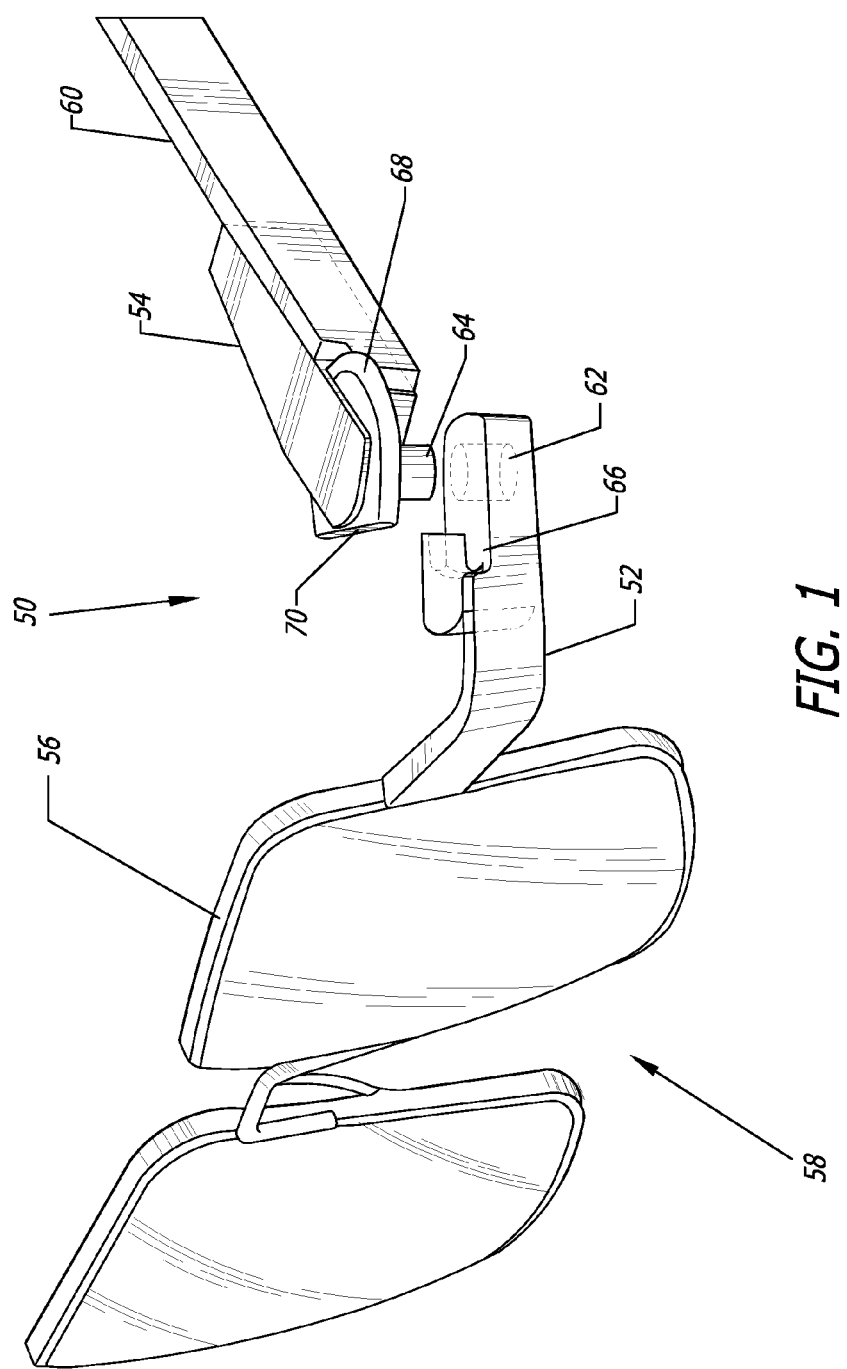
FIG. 1 is a partially exploded view of an eyewear hinge of the present invention.

The present invention is generally directed to hinges and a novel security ledge/security slot construction. The security ledge/security slot construction helps to retain the two sides of a hinge together without the use of screws or tightly fitting pins. A first part or side of the hinge includes a hinge receiver and a second part or side of the hinge includes a hinge post. The hinge post is configured to be inserted into the hinge receiver in such a manner that the second side of the hinge can freely or smoothly pivot about the first side of the hinge.

The security slot is preferably disposed on the first part of the hinge, generally above and proximate to the hinge receiver. The security ledge is preferably disposed on the second part of the hinge, generally above and co-axial with the hinge post. The security ledge and security slot are configured to engage each other through at least part of the arc of rotation of the second part of the hinge about the first part of the hinge. The engagement of the security slot and security ledge acts to retain the second part of the hinge together with the first part of the hinge, without the use of screws or tightly fitting pins. Such facilitates the assembly, disassembly, and repair of such hinges without the often time consuming or difficult task of working with screws or tightly fitting pins.

While this security ledge/security slot construction has application to many types of hinges, the following detailed description will focus on eyewear hinges and similar sized objects. This detailed description is not intended to limit the scope of this novel security ledge/security slot construction to eyewear hinges or similar devices.

The present invention is particularly directed to a novel eyewear hinge that eliminates the need for the tiny, fragile screw typically found in glasses. In particular, the present invention is directed to an eyewear hinge having a security ledge and a security slot that are mated to retain the pivoting earpiece on a lens mount. The inventive eyewear hinge may or may not include magnetic cartridges to assist in holding the earpiece on the lens mount or in a particular rotation with respect to the lens mount.

FIGS. 1-12 generally illustrate a first preferred embodiment of the inventive eyewear hinge, generally referred to by reference numeral 50. The eyewear hinge 50 generally comprises a lens mount 52 and a hinge support 54. The lens mount 52 is attached to a lens frame 56 as is typically found on a pair of glasses 58. The lens mount 52 may be permanently or removably attached to the lens frame 56 as is commonly done in this field of art. The hinge support 54 is attached to an earpiece 60. The hinge support 54 and earpiece 60 may be permanently or removably attached, or may be integrally formed as one piece. A person of ordinary skill in the art will appreciate the various forms that the hinge support 54 and earpiece 60 may take.

According to the present invention, the lens mount 52 includes a hinge receiver 62 that is configured to receive a hinge post 64 from the hinge support 54. The hinge receiver 62 and hinge post 64 are preferably configured to have a cylindrical or similar shape that permits pivotal rotation of the hinge support 54 relative to the lens mount 52. The lens mount 52 also includes a security slot 66 that is configured to receive and engage a security ledge 68 as the hinge support 54 is pivotally rotated relative to the lens mount 52.

The security slot 66 is disposed on the lens mount 52 in an area proximate to the hinge receiver 62. Preferably, the security slot 66 is disposed in an area above the hinge receiver 62 within an area representing an arc of rotation about the hinge receiver 62. In the illustrated embodiment, the security slot 66 is formed in a vertical wall adjacent to the hinge receiver 62 and that extends above the same. A person skilled in the art will realize that the structure of the security slot 66 may be configured in other ways to accomplish the same goals.

The security ledge 68 is disposed on the hinge support 54 in an area above the hinge post 64. Preferably, the security ledge 68 is disc-shaped and extends around a vertical wall on the hinge support 54 in an area above the hinge post 64. The security ledge 68 should extend into an area representing an arc of rotation of the hinge support 54 about the lens mount 52. With both the security slot 66 and security ledge 68 extending into this arc of rotation, the two components can engage and perform the intended security functions.

The security ledge 68 is generally circular or disc-shaped so as to engage the security slot 66 through a wide range of pivotal rotation. The security ledge 68 preferably includes a discontinuity or flattened portion 70 to permit attachment and/or removal of the hinge support 54 to or from the lens mount 52 without interference from the security slot 66 and the security ledge 68.

Figure 2:
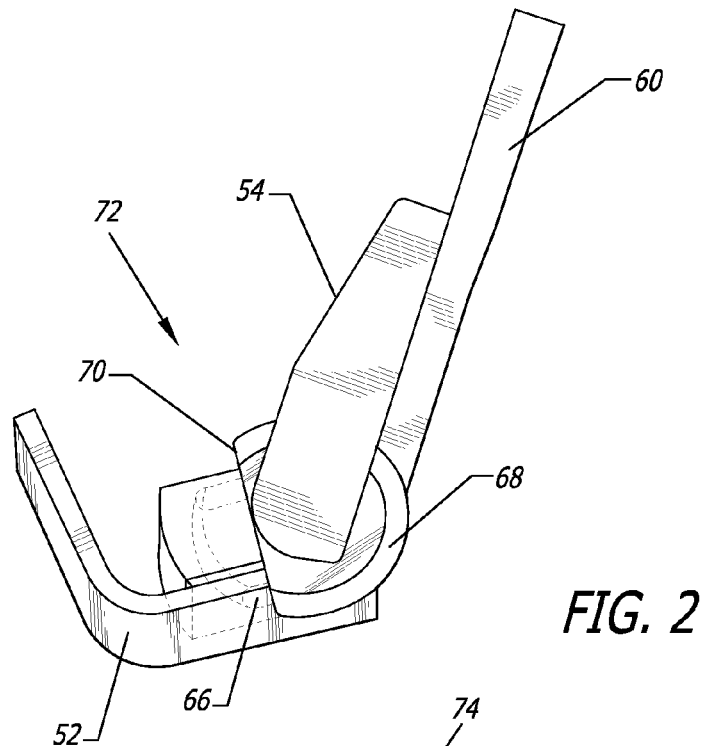
FIG. 2 is an elevated view of an eyewear hinge of the present invention, illustrating attachment of the pivoting earpiece to the lens mount.
Figure 3:
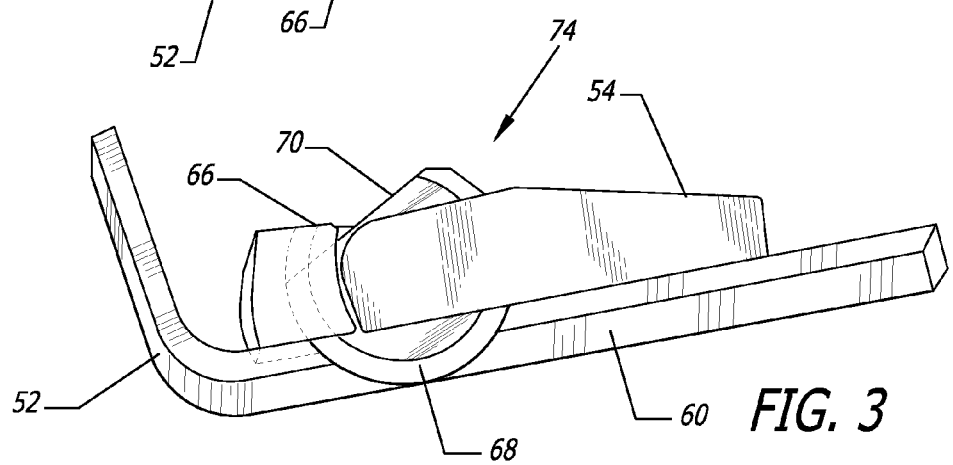
FIG. 3 is an elevated view of an eyewear hinge of the present invention, illustrating the pivoting earpiece in an open position.
Figure 4:
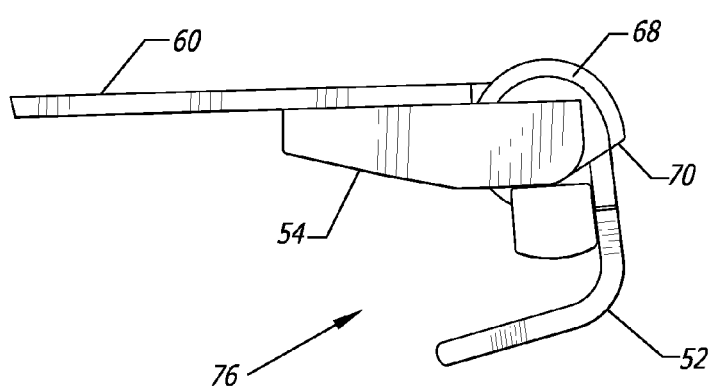
FIG. 4 is a top view of an eyewear hinge of the present invention, illustrating the pivoting earpiece in a closed position.

FIG. 2 illustrates a removal position or orientation of the hinge support 54 with respect to the lens mount 52. As illustrated, the flattened portion 70 of the security ledge 68 bypasses the security slot 66 to provide for insertion of the hinge post 64 into the hinge receiver 62. FIG. 3 illustrates an open position where the earpiece 60 is extended open such that a person may wear the glasses 58 with the earpiece 60 positioned over their ear. In this open position 74, the security ledge 68 engages the security slot 66 such that the hinge support 54 is retained flush against the lens mount 52. Similarly, FIG. 4 illustrates a closed position 76 in which the earpiece 60 is folded across the glasses 58. In this closed position 76, the security ledge 68 again engages the security slot 66 such that the hinge support 54 is retained securely against the lens mount 52.

Figure 5:
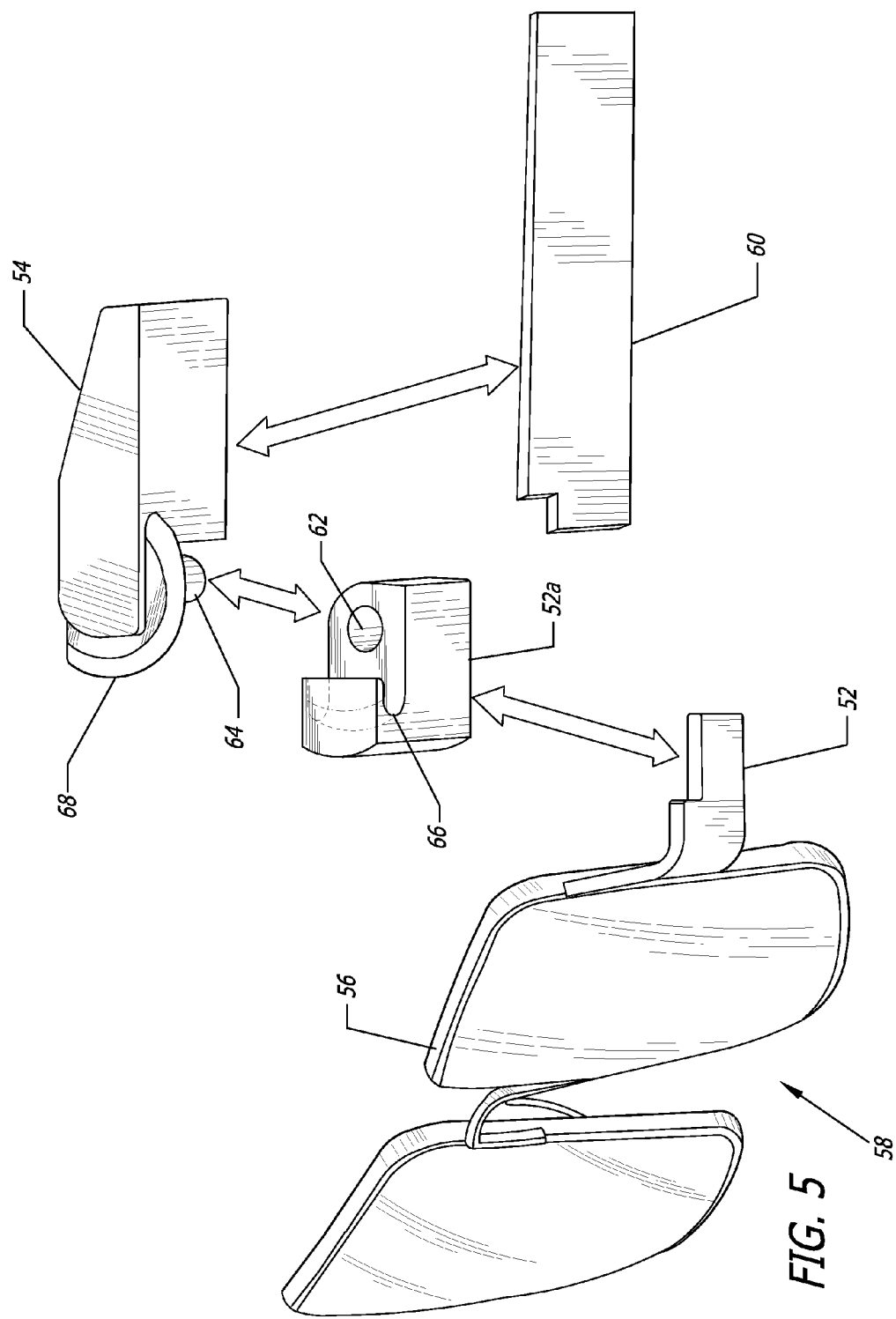
FIG. 5 is an exploded view of an eyewear hinge of the present invention illustrating the relative positioning and assembly of the various components.

As illustrated in FIG. 5, the lens mount 52 may include a base 52a that is removable from the lens mount 52. As with the hinge support 54 and earpiece 60, the lens mount 52 and base 52a may be permanently attached or removably attached in manners known by those skilled in the art. Where the base 52a is removable from the lens mount 52, it is preferably the base 52a that includes the hinge receiver 62 and security slot 66.

Figure 6A:
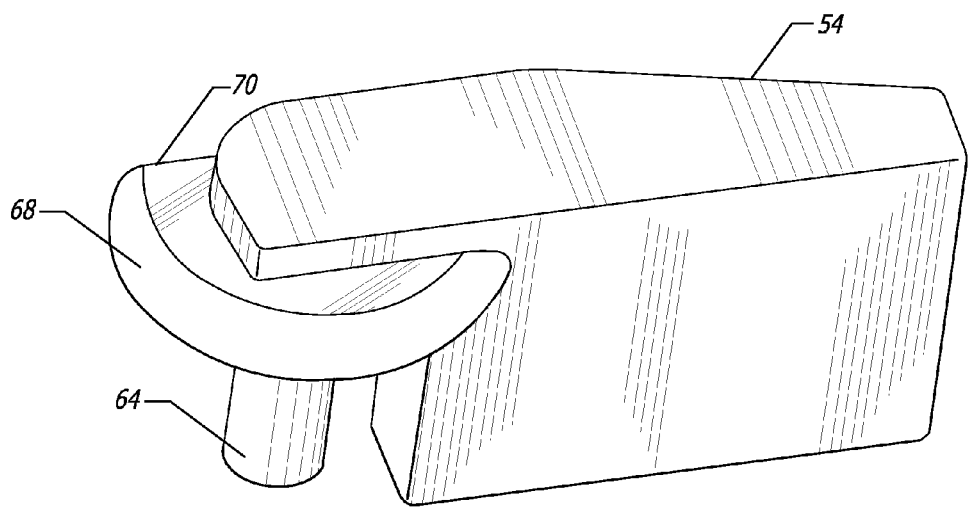
FIG. 6a is a perspective view of a preferred embodiment of a hinge support for a pivoting earpiece of an eyewear hinge of the present invention.
Figure 6B:
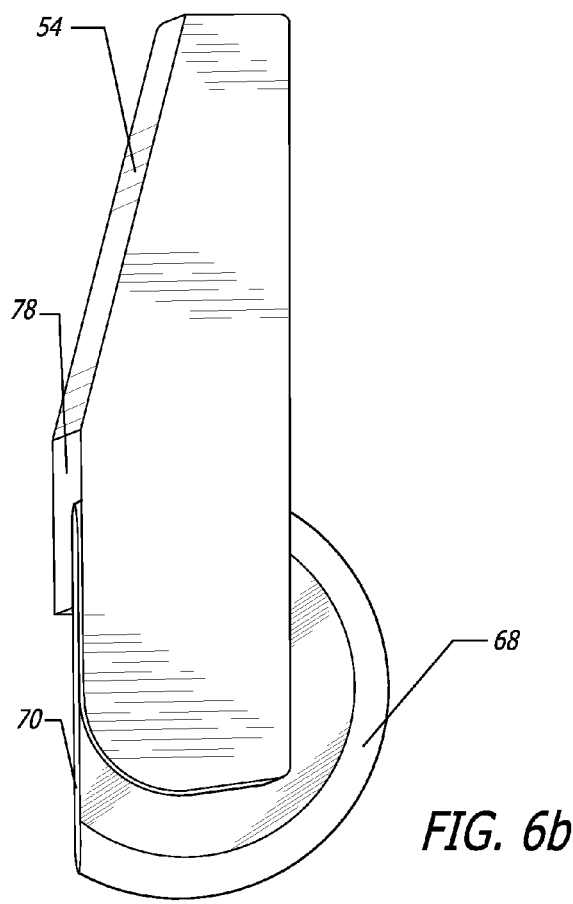
Figure 7:
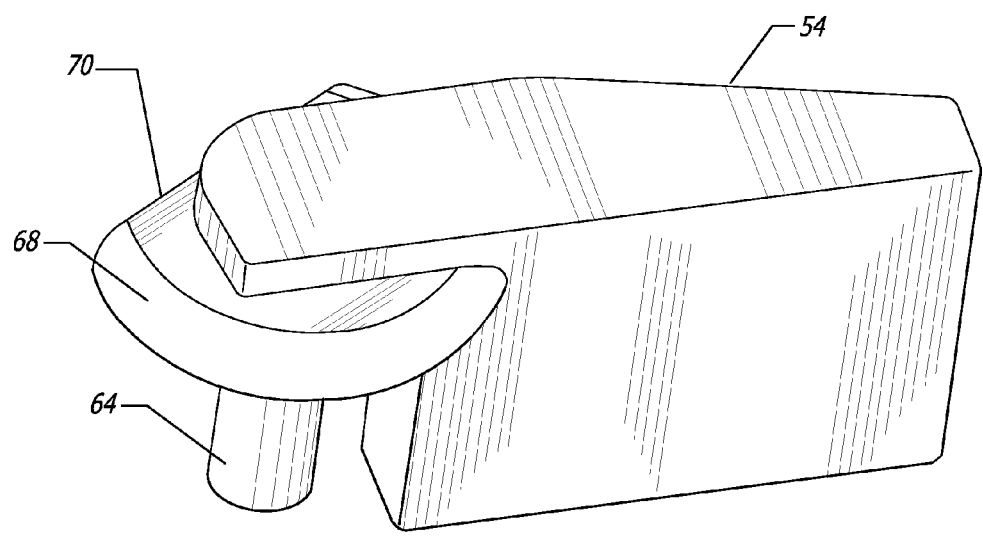
FIG. 7 is a perspective view of another preferred embodiment of a hinge support of a pivoting earpiece of an eyewear hinge of the present invention.
Figure 8:
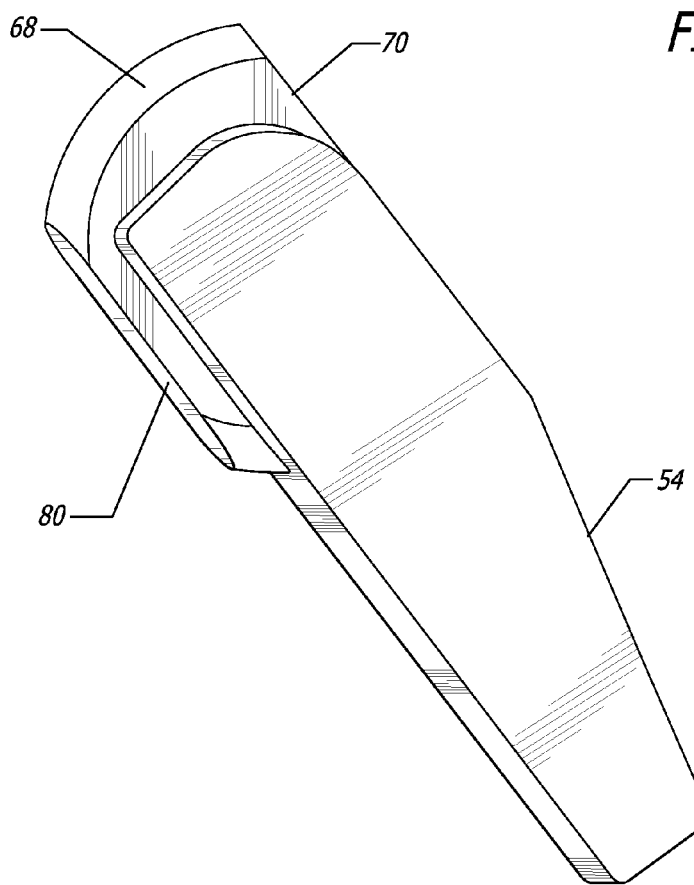
FIG. 8 is a top view of another alternate embodiment of a hinge support of a pivoting earpiece of an eyewear hinge of the present invention.
Figure 9:
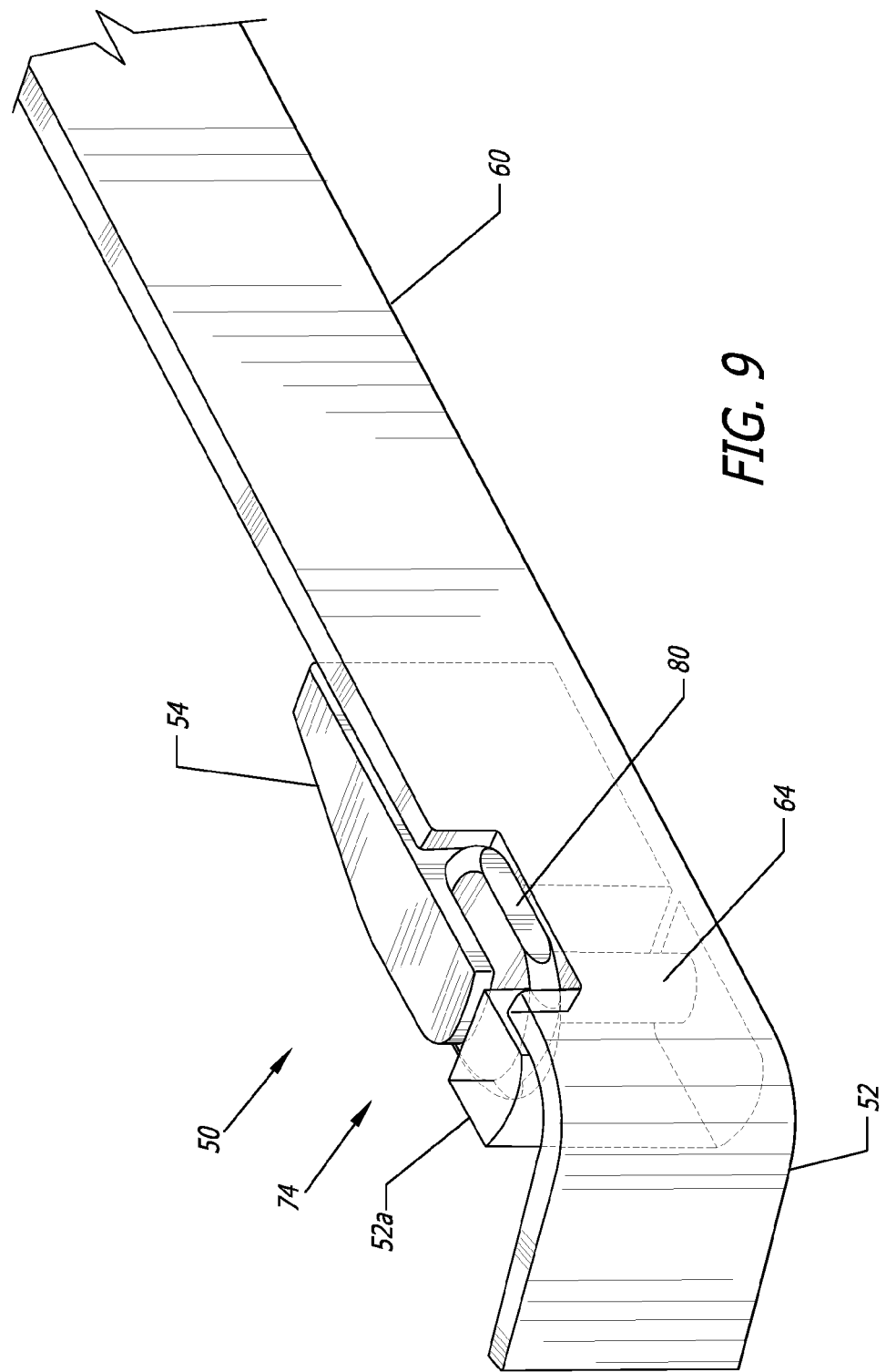
FIG. 9 is a perspective view of an assembled eyewear hinge of the present invention.

FIG. 6a illustrates an alternate configuration of the hinge support 54 wherein the security ledge 68 is rotated such that the flattened portion 70 is flush with an inside surface 78 of the hinge support 54. FIG. 6b presents an alternate view more clearly showing the flattened portion 70 flush with the inside surface 78. FIG. 7 shows a perspective view of the hinge support 54 with the flattened portion 70 partially rotated as illustrated in FIGS. 1-4. FIG. 8 illustrates another alternate embodiment of the hinge support 54 further including an outside flattened portion 80 on the security ledge 68. The purpose of this outside flattened portion 80 is so that the security ledge 68 does not protrude beyond an outside edge of the earpiece 60 when it is attached to the hinge support 54. This is clearly shown in FIG. 9 illustrating the eyewear hinge 50 in an open position 74.

FIGS. 10-11 illustrate a further variation on the security slot 66 and security ledge 68 comprising engaging ridges and grooves thereon. In particular, the security slot 66 preferably includes a groove 82 on an upper surface configured to engage a ridge 84 on an upper surface of the security ledge 68. FIGS. 10*a* and 10*b* show close-up views of the groove 82 and ridge 84 respectively. FIG. 11 illustrates a similar groove 82 and a similar ridge 84 on bottom surfaces of the security slot 66 and security ledge 68, respectively. These grooves 82 and ridges 84 may be provided in any combination of configurations, e.g., only on the top surface, only on the bottom surface, or on both the top and bottom surfaces. The grooves 82 and ridges 84 may also be replaced by mating ridges 84 on the facing surfaces of the security slot 66 and security ledge 68. The mating ridges 84 may laterally engage each other as one would be spaced adjacent to another such that adjacent faces would engage as threads on a bolt and nut combination.

In addition, the grooves 82 and ridges 84 may be slightly inclined with respect to the relative rotation arc of the hinge support 54 relative to the lens mount 52. With this slight inclination of the grooves 82 and ridges 84, the same may act as threads to exert either a pushing force or a pulling force on the hinge support 54 relative to the lens mount 52 in a direction transverse to the hinge post 64. This makes the attachment between the hinge support 54 and lens mount 52 more secure when the eyewear hinge 50 is in either the open position 74 or the closed position 76. In a variation, the grooves 82 may be disposed on the security ledge 68 and the ridges 84 may be disposed on the security slot 66.

Figure 12:
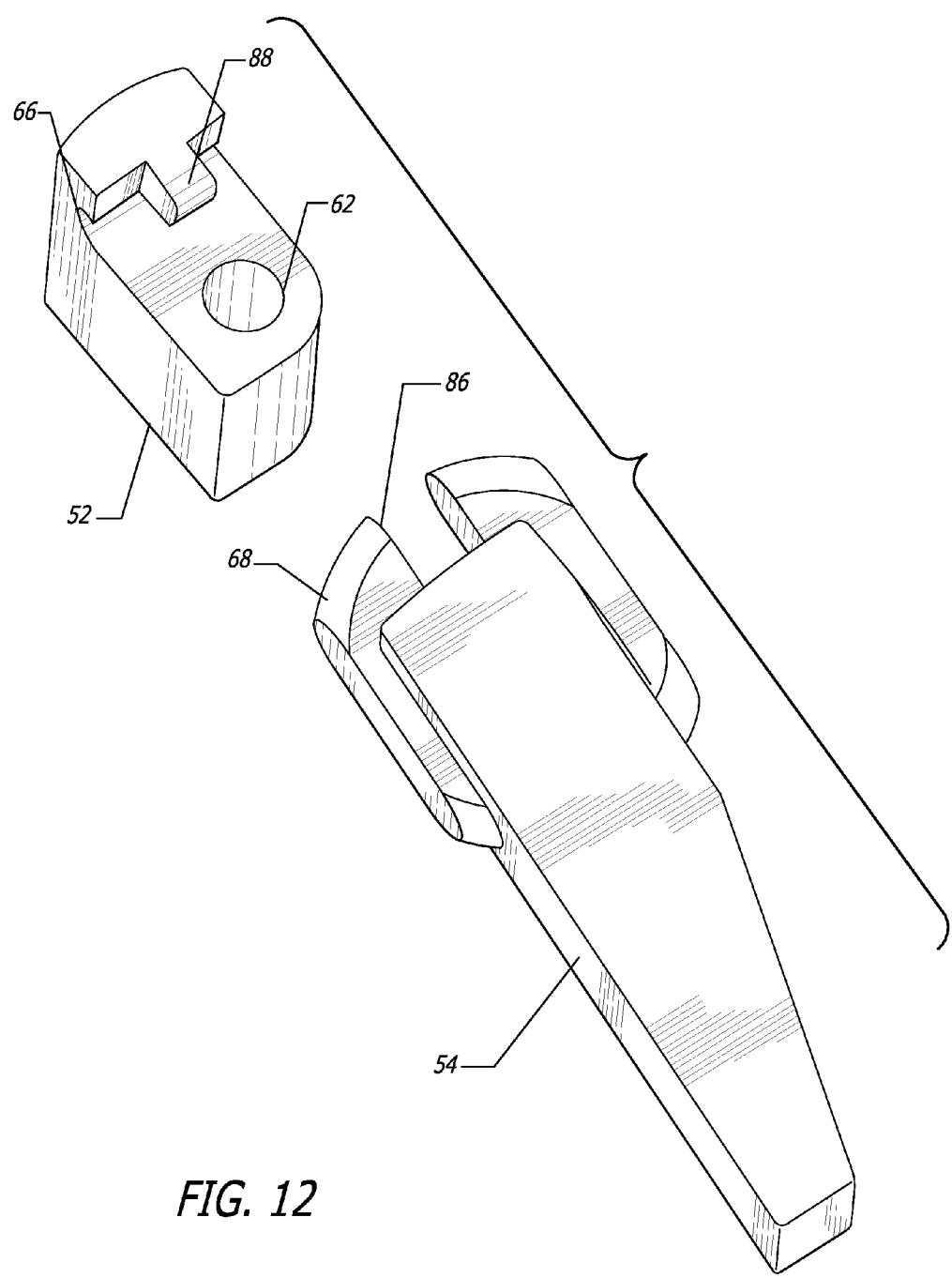
FIG. 12 is an alternate embodiment of the eyewear hinge of the present invention, illustrating a notched security ledge and security slot.
Figure 13:
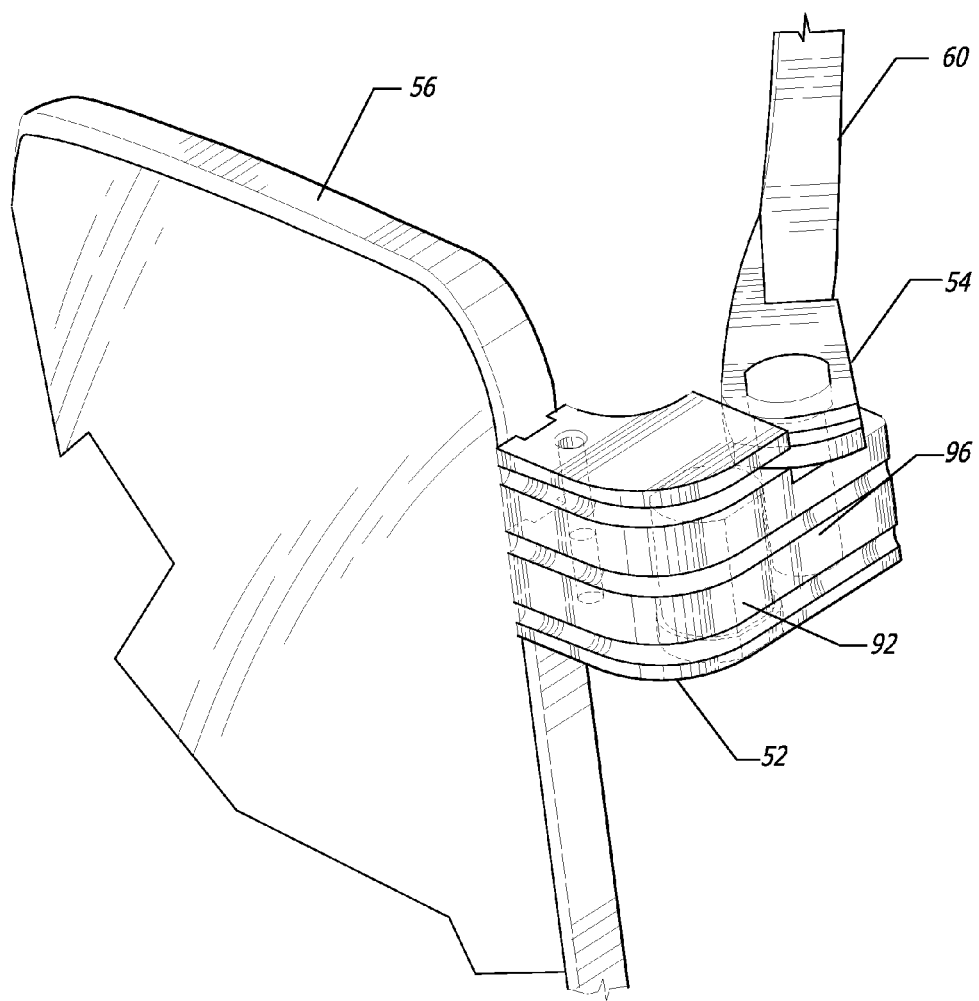
FIG. 13 is a perspective view of an alternate embodiment of an eyewear hinge of the present invention, illustrating magnetic features.
Figure 14A:
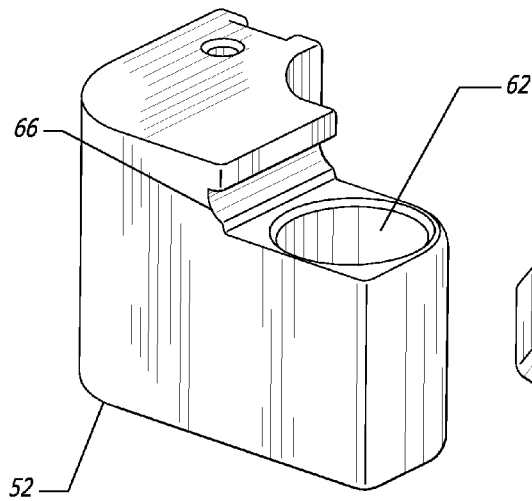
FIG. 14a is a perspective view of a lens mount of the alternate embodiment in FIG. 13.
Figure 14B:
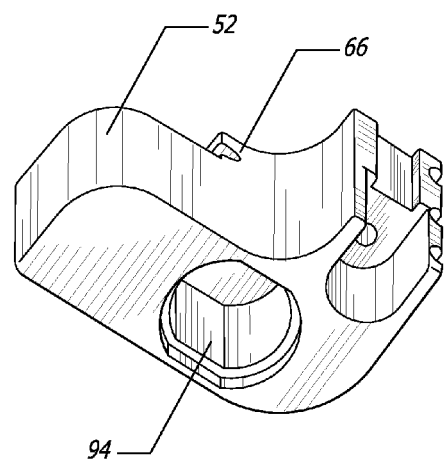
Figure 15A:
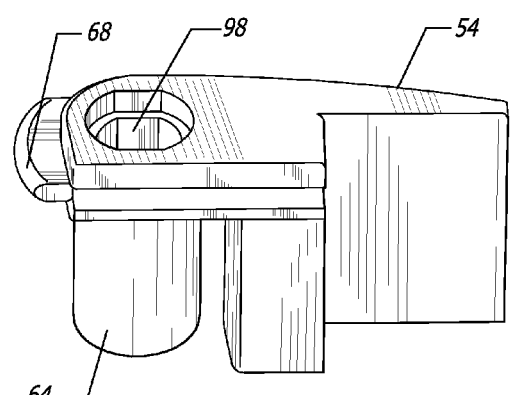
FIG. 15a is a perspective view of a hinge support of the alternate embodiment of FIG. 13.
Figure 15B:
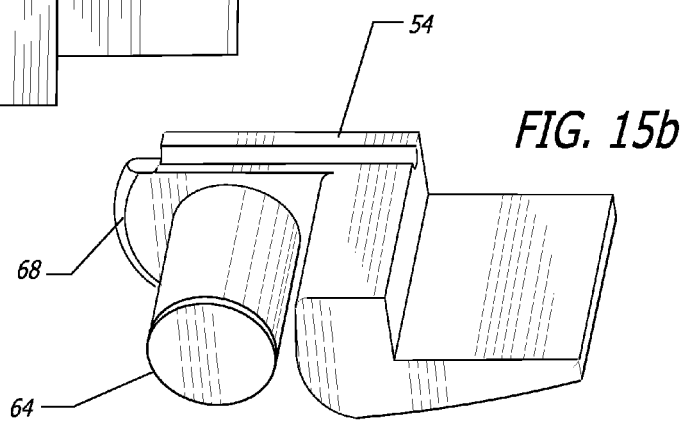
Figure 16:
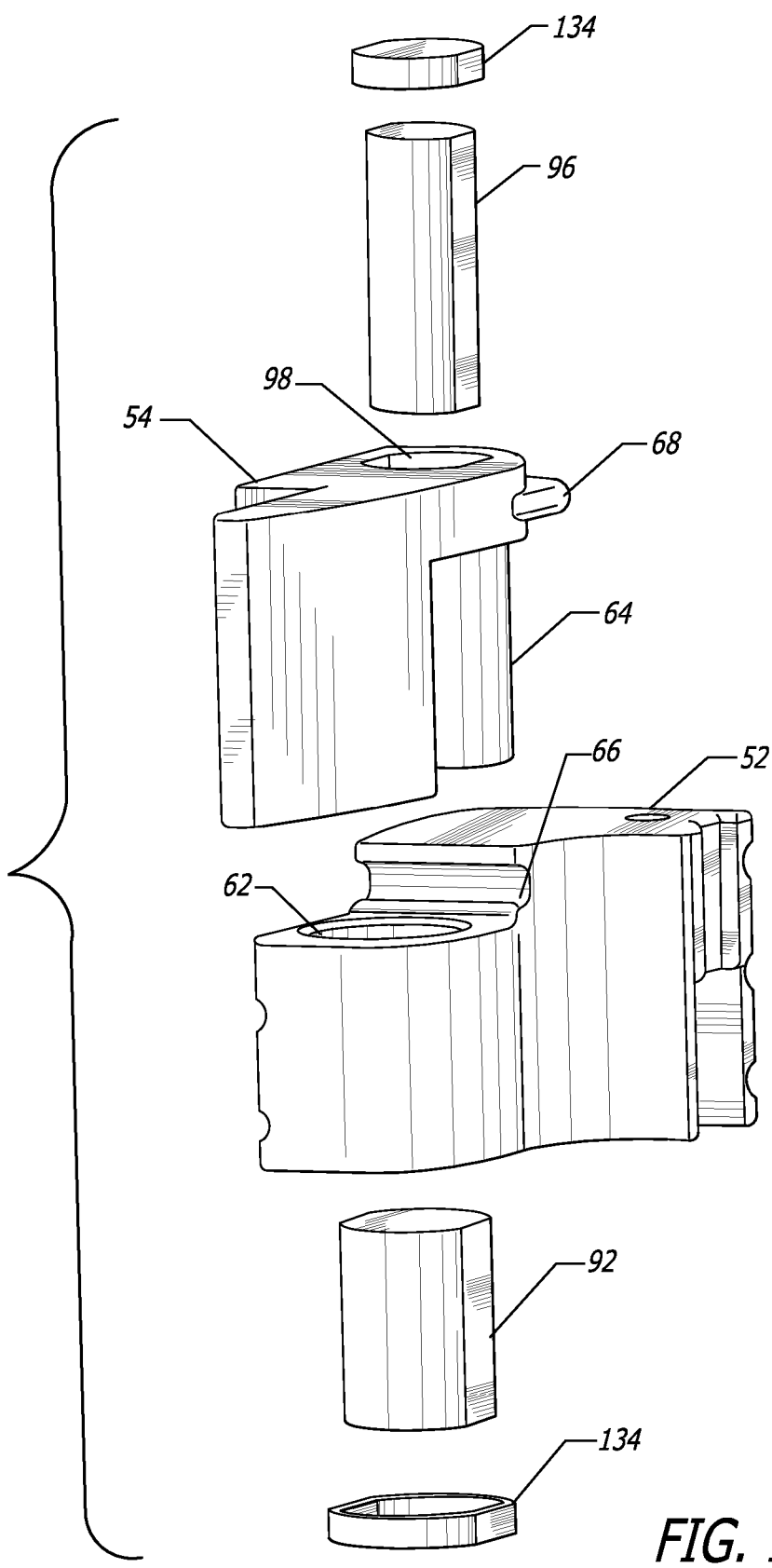
FIG. 16 is an exploded view of the eyewear hinge of the embodiment shown in FIG. 13.

FIG. 12 illustrates an alternate embodiment of the eyewear hinge 50 wherein the security ledge 68 includes a notch 86 configured to pass over a tooth 88 on the security slot 66. This notch 86 provides a different manner of retaining the hinge support 54 on the lens mount 52. The tooth 88 engages a top surface of the security ledge 68 so that the hinge support 54 may not be removed unless the notch 86 is aligned with the tooth 88. This notch 86 may be disposed in different positions around the security ledge 68 depending upon the desired rotation of the hinge support 54 for the removal position 72.

Although illustrated in various drawings, the flattened portion 70 and the outside flattened portion 80 may be included with various other embodiments without affecting the operation of the other features such as the notch 86 and tooth 88, or the grooves 82 and ridges 84.

FIGS. 13-28 generally illustrate an alternate embodiment of the inventive eyewear hinge 90. This alternate embodiment of the eyewear hinge 90 is generally constructed similar to the previous embodiment 50 but includes magnetic cartridges configured to retain the hinge support 54 and lens mount 52 engaged in particular relative rotations. The lens mount 52 includes a first magnetic cartridge 92 disposed vertically and generally adjacent to the hinge receiver 62. The first magnetic cartridge 92 is disposed in a first interior chamber 94 adjacent to and generally parallel with the hinge receiver 62. A second magnetic cartridge 96 is generally contiguous with the hinge post 64 and disposed in a second interior chamber 98 coaxially disposed within the hinge post 64. Chamber caps 134 cover each of the interior chambers 94, 98.

Figure 17:
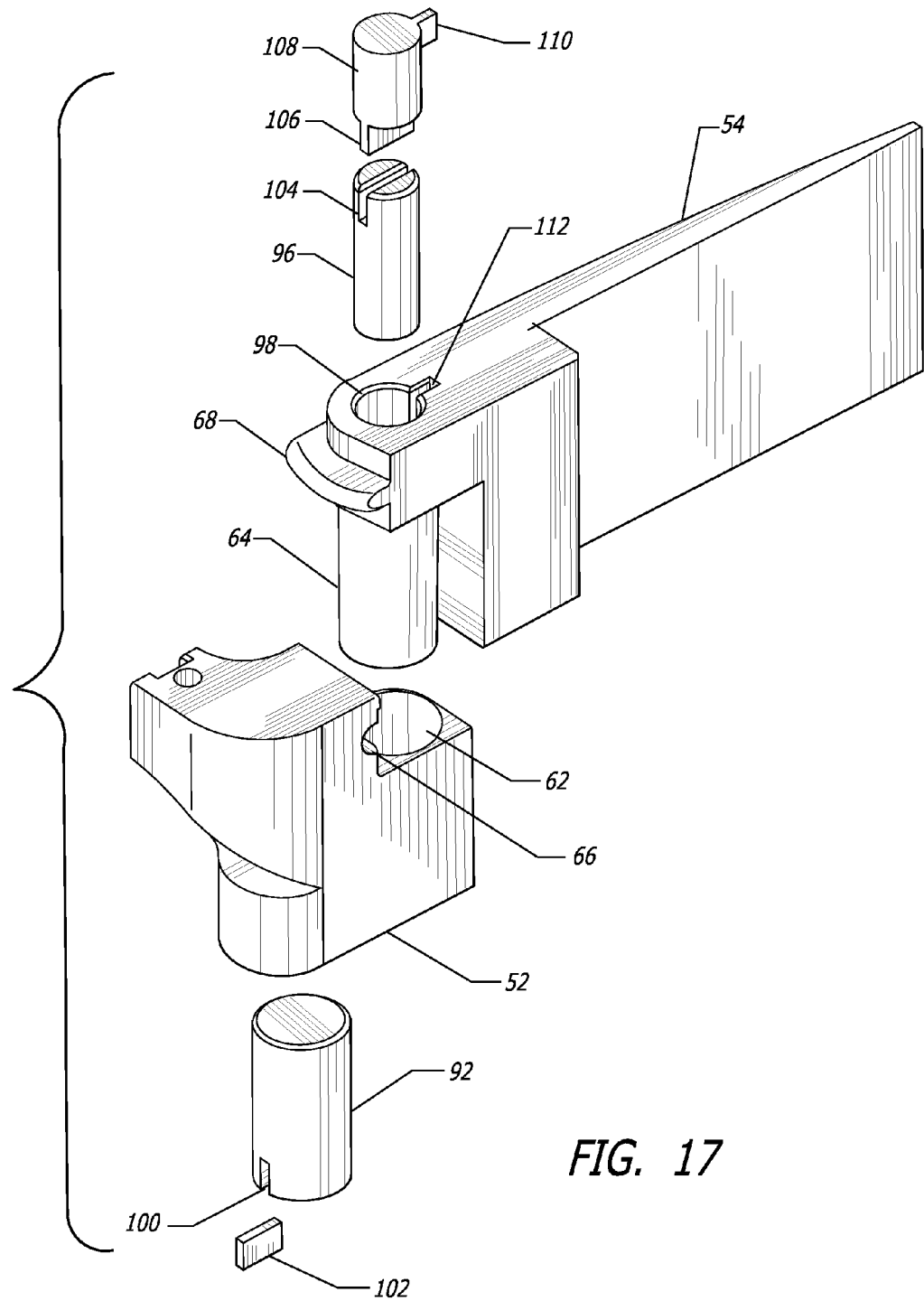
FIG. 17 is an exploded view of an alternate embodiment of the eyewear hinge shown in FIG. 13.

So that the magnetic cartridges 92, 96 do not rotate within the interior chambers 94, 98 the same may include a locking mechanism. In one preferred embodiment, as illustrated in FIG. 17, the locking mechanism may comprise matching locking slots configured to receive a locking insert. The first magnetic cartridge 92 may include a locking slot 100. This locking slot 100 is configured to receive a locking insert 102 which would also engage a matching locking slot (not shown) adjacent to an opening on the first interior chamber 94 on the underside of the lens mount 52. When this locking insert engages the locking slot 100 and the matching locking slot, the first magnetic cartridge 92 is locked in a particular angle of rotation such that it will not rotate within the first interior chamber 94.

Similarly, the second magnetic cartridge 96 includes a locking slot 104 configured to receive a locking insert 106 disposed on an underside of a hinge cap 108. The hinge cap 108 includes a locking tab 110 extending from a side thereof and configured to engage a locking notch 112 on an opening to the second interior chamber 98. The relative configurations of the locking slot 104, locking insert 106, locking tab 110, and locking notch 112 operate to hold the second magnetic cartridge 96 in a particular orientation such that it does not rotate within the second interior chamber 98. One will appreciate that the various components of this embodiment of the locking means may be configured in various forms to achieve the desired results.

Figure 18:
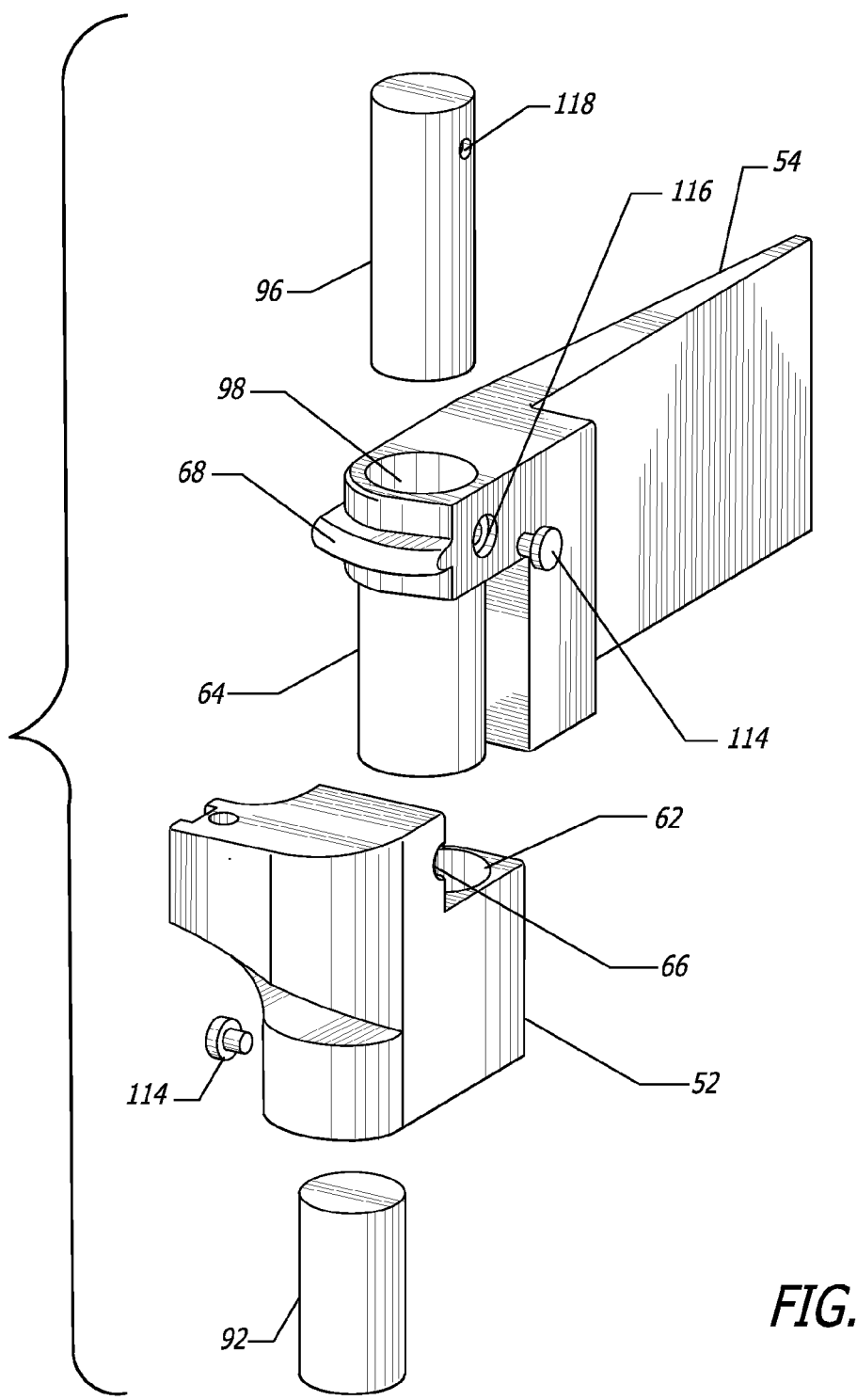
FIG. 18 is an exploded view of another alternate embodiment of the eyewear hinge of FIG. 13.

FIG. 18 illustrates another preferred embodiment of the locking mechanism, wherein set pins are used. Specifically, a set pin 114 passes through an opening 116 in a wall of the hinge support 54 so as to engage a set hole 118 in a side of the second magnetic cartridge 96. Upon engagement of the set pin 114, in the set hole 118 the second magnetic cartridge 96 will be restricted in its ability to rotate within the second interior chamber 98. The first magnetic cartridge 92 has a similar configuration to accommodate a set pin 114, an opening (not shown) and a set hole (not shown) as that described for the second magnetic cartridge 96. In this way, both magnetic cartridges 92, 96 will be locked into a particular rotation within their respective interior chambers 94, 98.

Figure 19:
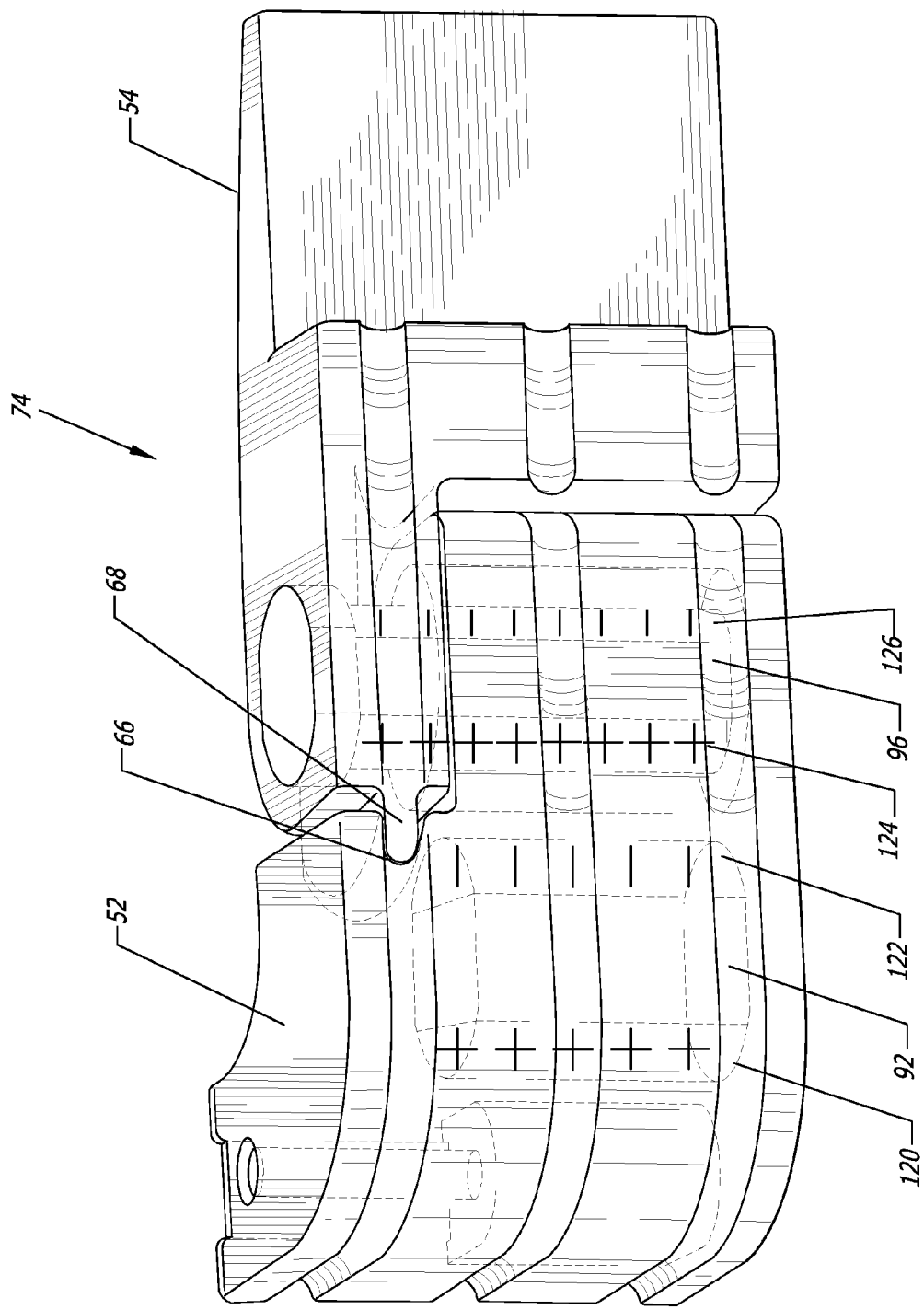
FIG. 19 is a close-up translucent view of the eyewear hinge of FIG. 13.

FIG. 19 illustrates the relative positions of the magnetic cartridges 92, 96 with regard to their respective polarities. The first magnetic cartridge 92 has a first pole 120 having a positive polarity and a second pole 122 having a negative polarity. The relative polarities of the first and second poles 120, 122 are indicated by their respective indicated signs. The second magnetic cartridge 96 has a first pole 124 having a positive polarity and a second pole 126 having a negative polarity—the polarities of the first and second poles are the same as the polarities of the first and second poles on the first magnet cartridge 92. Again, the relative polarities of the poles 124, 126 are indicated by their respective indicated signs. In a preferred embodiment, the second pole 122 of the first magnetic cartridge 92 and the first pole 124 of the second magnetic cartridge 96 have opposite polarities so as to have a magnetic attraction. This means that the first poles 120, 124 of both magnetic cartridges 92, 96 have the same polarity, as do the second poles 122, 126 of both magnetic cartridges 92, 96 have the same polarities, which are opposite to those of the first poles 120, 124. In this way, the magnetic attraction between the second pole 122 and the first pole 124 help to retain or "snap" the hinge support 54 into the open position 74 relative to the lens mount 52. The positive and negative polarities on both magnets may be swapped and still function as intended.

Figure 20:
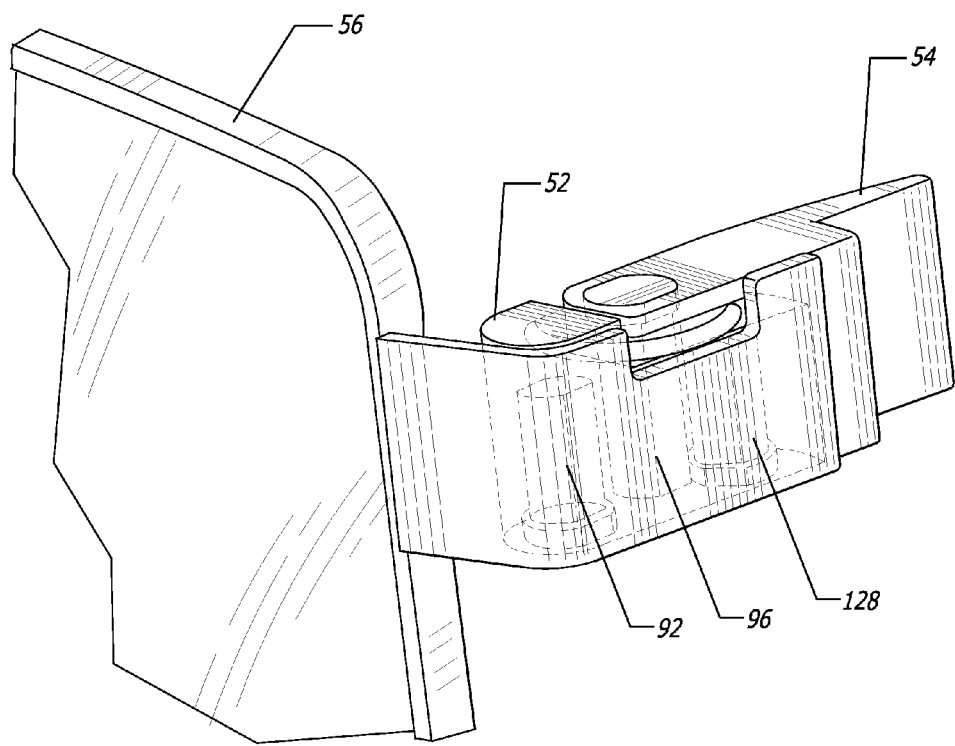
FIG. 20 is a perspective view of an alternate embodiment of the eyewear hinge of FIG. 13.
Figure 21A:
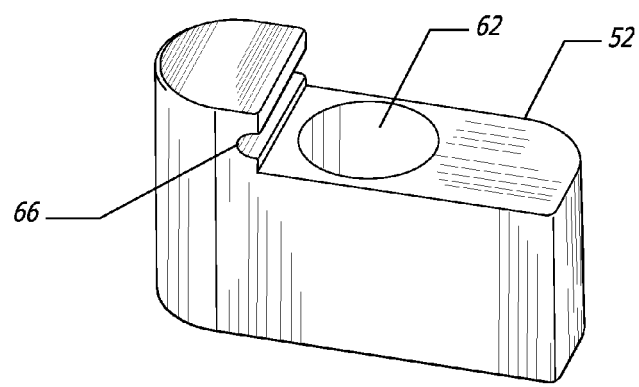
FIG. 21a is a perspective view of the lens mount of the alternate embodiment of FIG. 20.
Figure 21B:
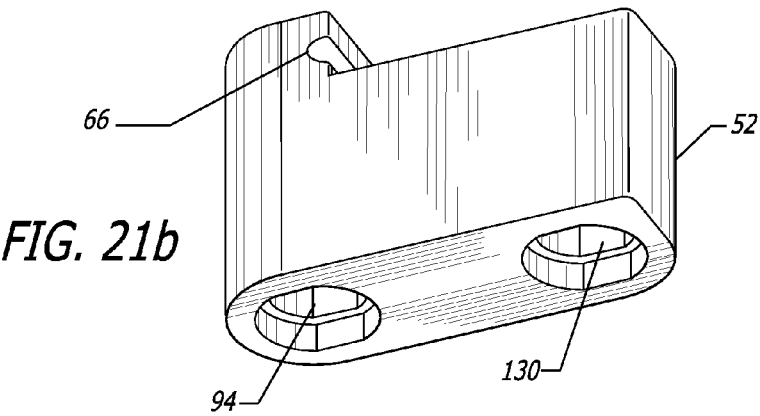
Figure 22:
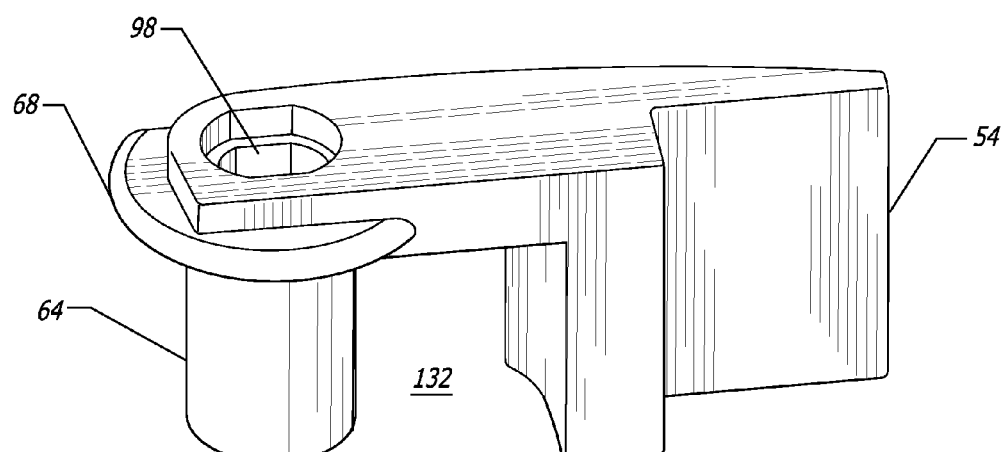
FIG. 22 is a perspective view of the hinge support of the alternate embodiment of FIG. 20.
Figure 23:
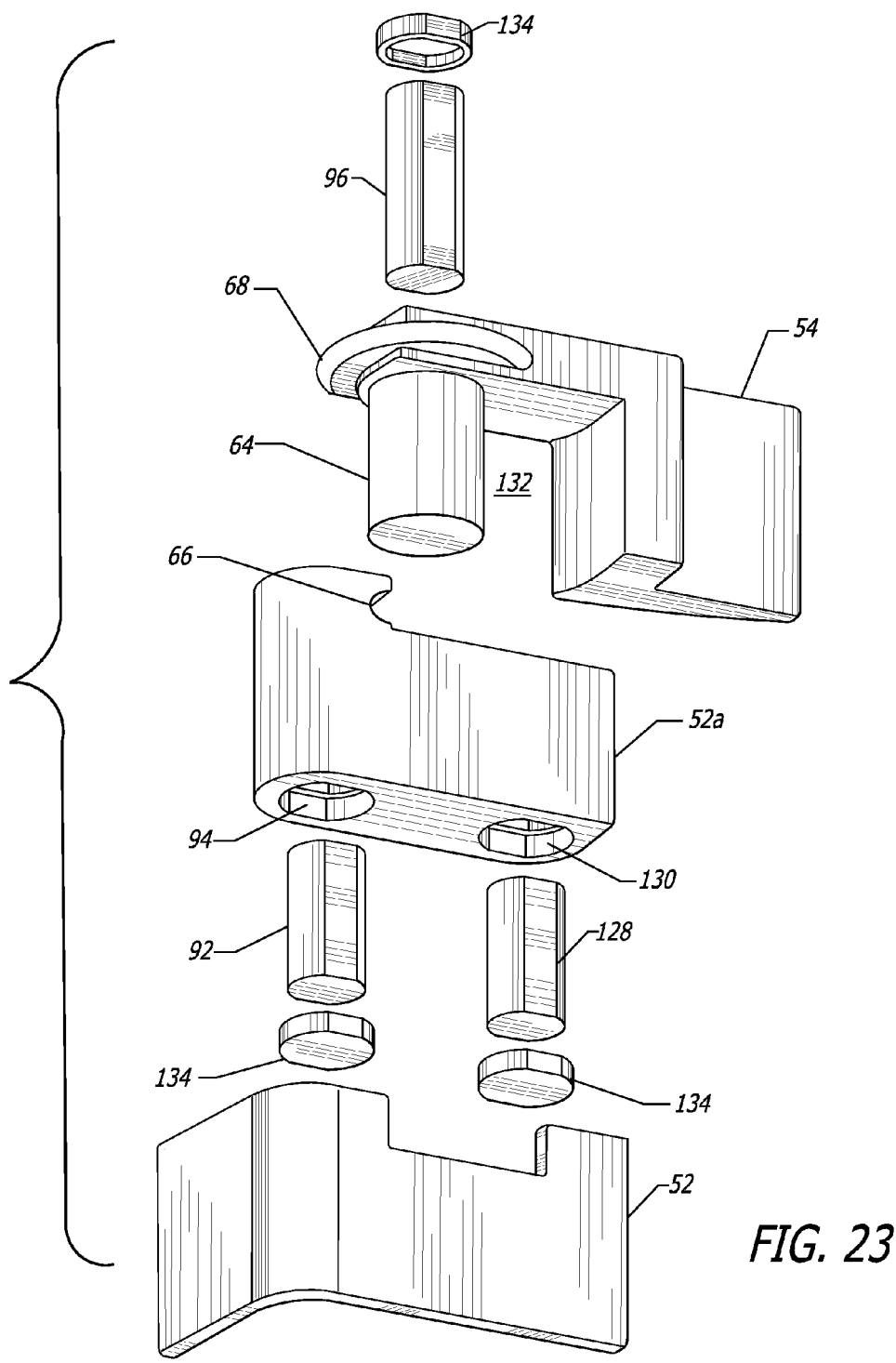
FIG. 23 is an exploded view of the alternate embodiment of the eyewear hinge of FIG. 20.
Figure 24A:
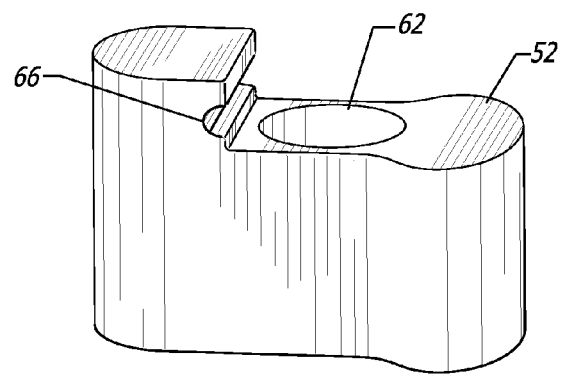
FIG. 24a is a perspective view of a lens mount of another alternate embodiment of the eyewear hinge shown in FIG. 20.
Figure 24B:
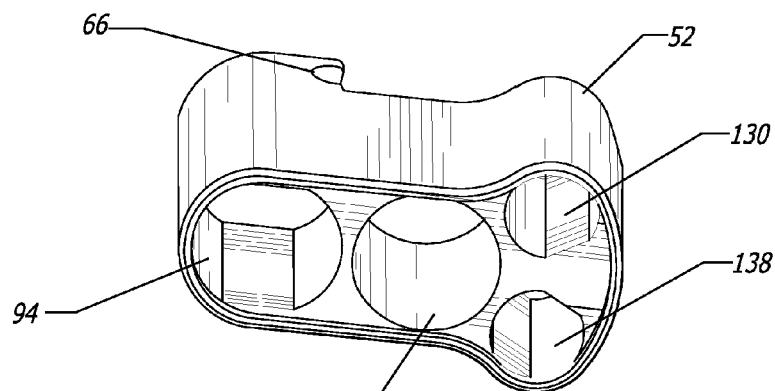
Figure 25:
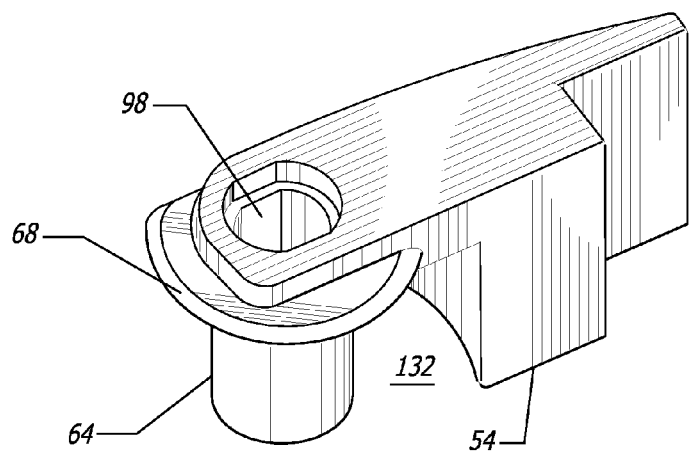
Figure 26:
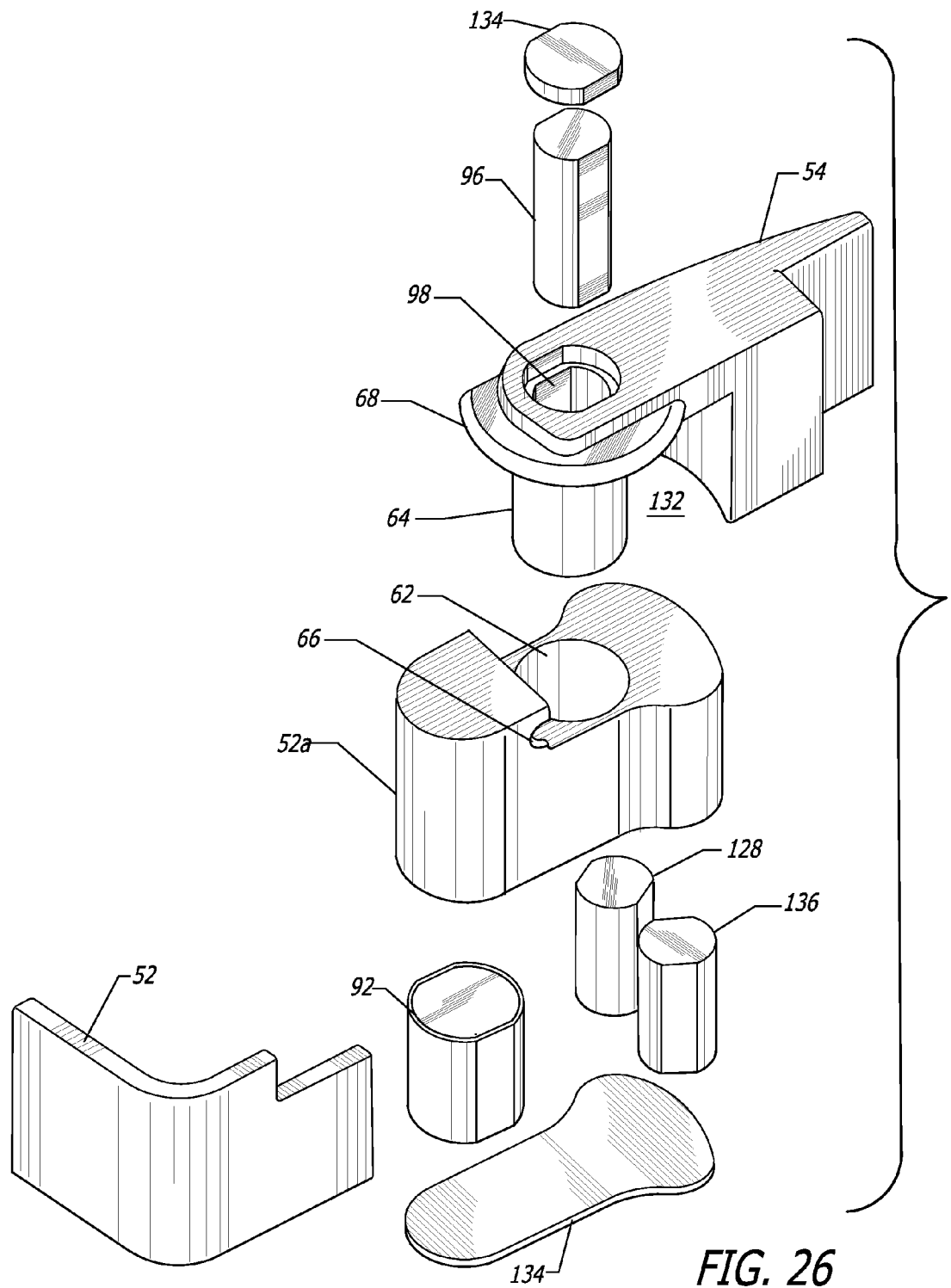
FIG. 26 is an exploded view of the alternate embodiment of the eyewear hinge components shown in FIGS. 24a and 25.

FIG. 20 illustrates an alternate embodiment wherein the lens mount 52 includes two magnetic cartridges surrounding the magnetic cartridge of the hinge support 54. This embodiment includes the first magnetic cartridge 92 and the second magnetic cartridge 96 as described above. A third magnetic cartridge 128 is disposed in a third interior chamber 130 located in the lens mount 52 on the opposite side of the hinge receiver 62 relative to the first interior chamber 94. The hinge support 54 has a similar second interior chamber 98 contained within the hinge post 64 as described above. One can see in FIG. 22 that the hinge support 54 is constructed slightly differently with a clearance gap 132 between the hinge post 64 and the body of the hinge support 54. This clearance gap is necessary to accommodate the additional structure of the lens mount 52 which contains the third interior chamber 130. The assembly and construction of the magnetic cartridges 92, 96, 128 relative to the interior chambers 94, 98, 130 may be similar to that as described above. FIG. 23 illustrates chamber caps 134 configured to seal each of the interior chambers 94, 98, 130 and retain the magnetic cartridges 92, 96, 128 therein. This embodiment may also employ any of the locking means described above.

As described above regarding the polarities of the magnetic cartridges 92, 96, the third magnetic cartridge 128 is preferably positioned such that the polarities of the adjacent poles on the second magnetic cartridge 96 and the third magnetic cartridge 128 will be opposite. In this configuration, the third magnetic cartridge 128 will have an identical rotational polarity configuration as the first magnetic cartridge 92 such that their respective poles are oriented on the same sides.

Figure 27:
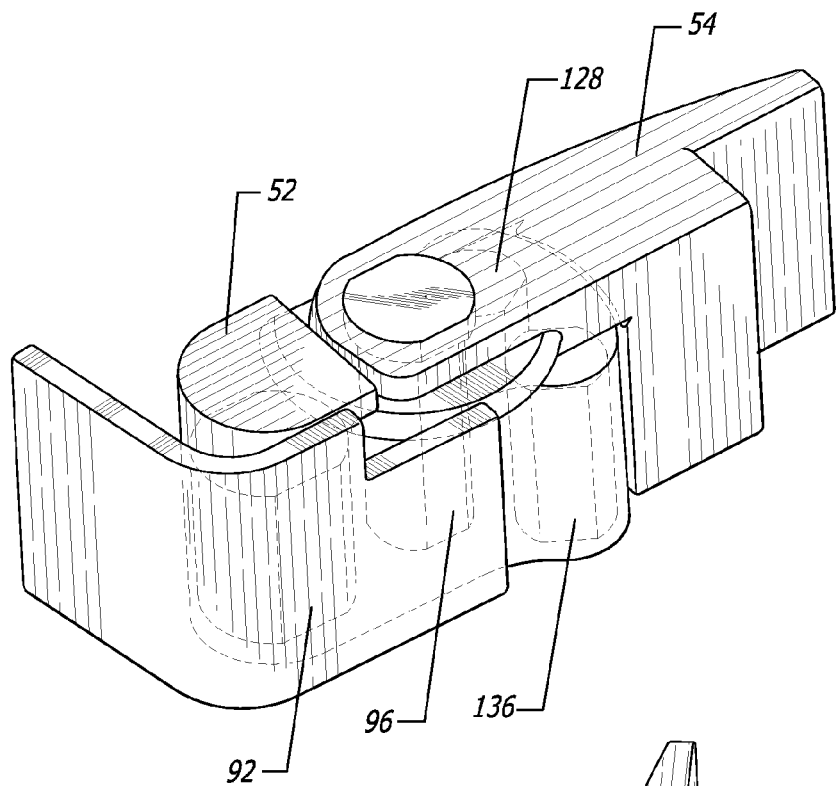
FIG. 27 is a close-up view of the eyewear hinge of FIG. 26, illustrated in the open position.
Figure 28:
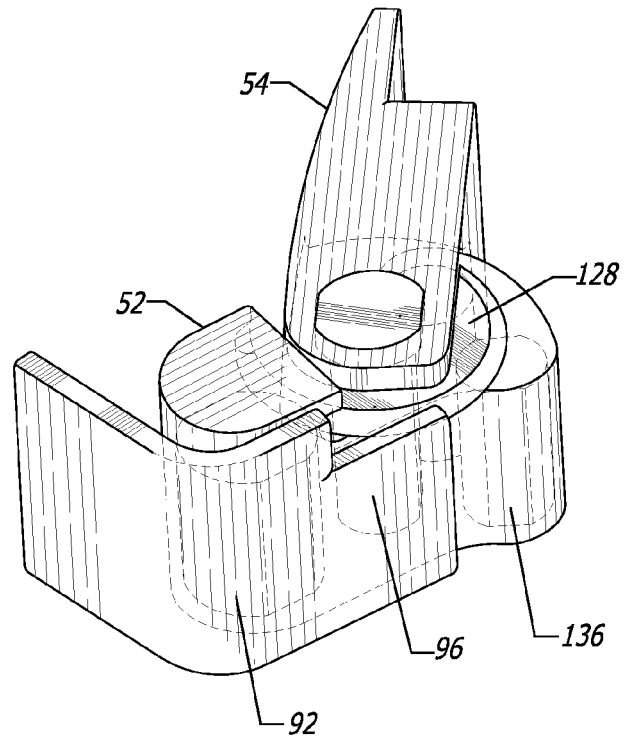
FIG. 28 is a close-up view of the eyewear hinge of FIG. 27, illustrated in a partially closed position.
Figure 29:
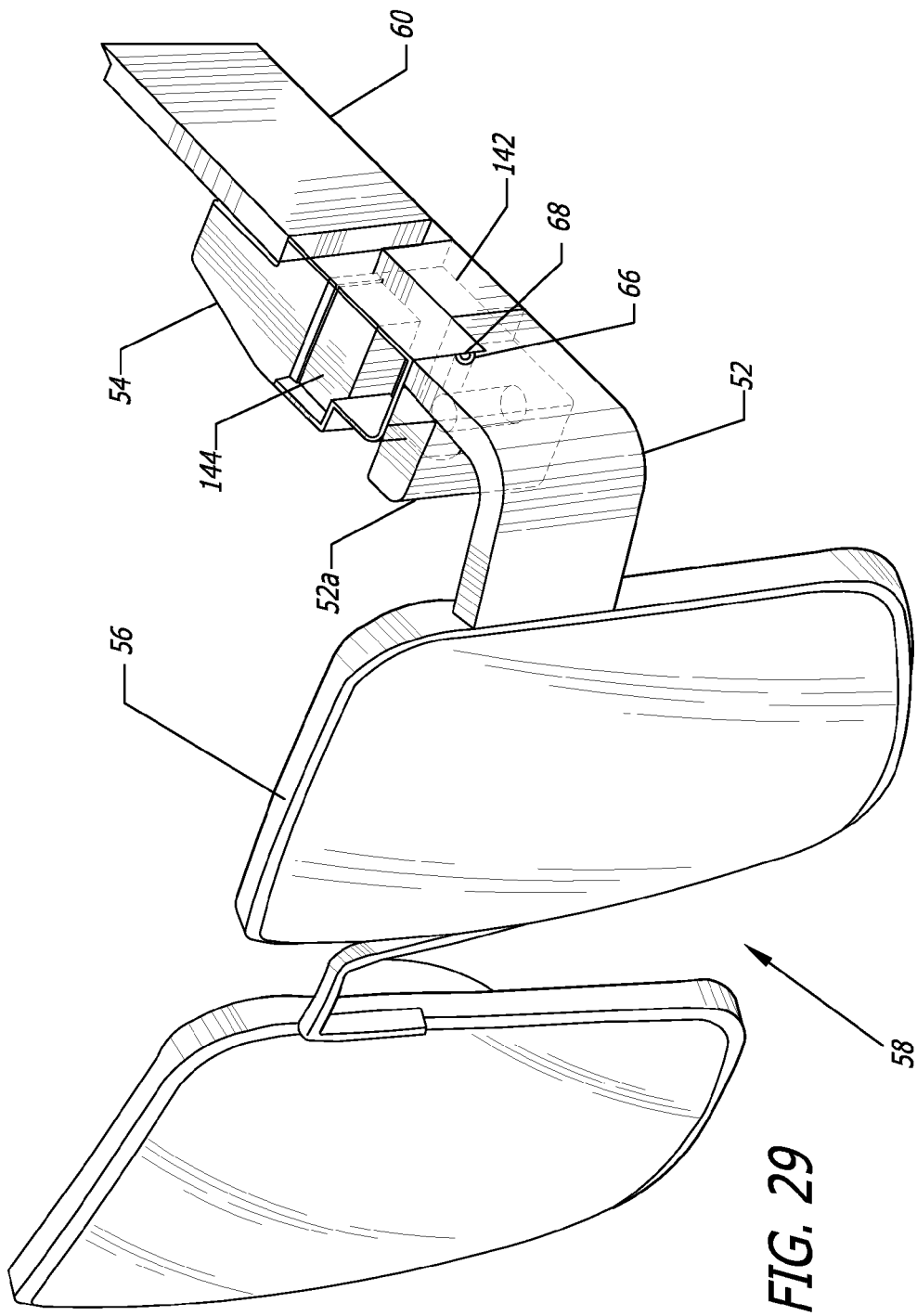
FIG. 29 is a perspective view of an alternate embodiment of the eyewear hinge of the present invention, illustrating lateral rectangular magnets.
Figure 30:
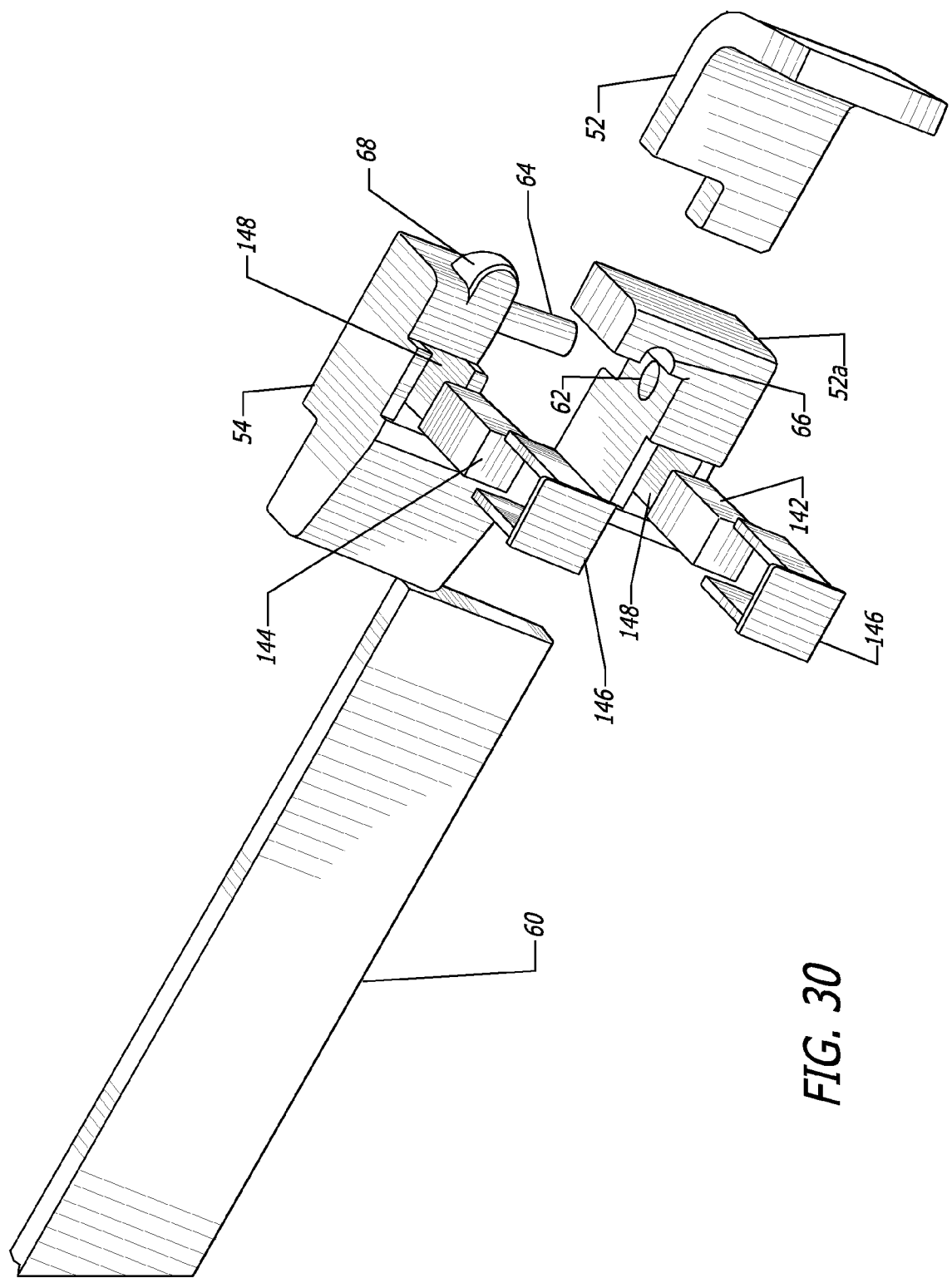
FIG. 30 is an exploded view of the eyewear hinge of FIG. 29.

FIGS. 24a-28 illustrate another alternate embodiment of this eyewear hinge 90. In this embodiment, the lens mount 52 includes a fourth magnetic cartridge 136 disposed in a fourth interior chamber 138. The hinge support 54 has the second magnetic cartridge 96 disposed in the second interior chamber 98 as described above. The hinge support 54 also includes the clearance gap 132 described above. In this embodiment, the third and fourth magnetic cartridges 128, 136 are configured generally with the same polarities adjacent to each other and adjacent to an opposite polarity on the second magnetic cartridge 96 when the eyewear hinge 90 is in the open position 74. The inclusion of three magnetic cartridges in the lens mount 52 provides for a stronger magnetic force to hold the hinge support 54 in the open position 74. FIGS. 27 and 28 illustrate the relative orientations of the poles of the magnetic cartridges 92, 96, 128, 136 as the hinge support 54 is moved from an open position 74 (FIG. 27) in the direction of a closed position (FIG. 28).

FIGS. 29-35 illustrate another alternate embodiment of the eyewear hinge 140 of the present invention. In this embodiment of the eyewear hinge 140, magnetic bodies are horizontally disposed in a superposing relationship in the lens mount 52 and hinge support 54.

The lens mount 52 includes a first magnetic body 142, which is generally rectangular in shape with a long axis disposed laterally across the lens mount 52a. The hinge support 54 contains a second magnetic body 144 that is also generally rectangular in shape with a long axis disposed laterally across the hinge support 54. The first and second magnetic bodies 142, 144 may be presented in other shapes provided that they are both generally similar in shape and possess similar magnetic configurations. The magnetic bodies 142, 144 are preferably disposed such that poles having opposite polarities are generally superposed when the eyewear hinge 140 is in the open position 74. As with the other embodiments described above, this superposition of opposite polarities will provide a magnetic attraction force to help retain the eyewear hinge 140 in the open position 74.

In one particular embodiment, the magnetic bodies 142, 144 may be contained in removable covers 146 that are configured to retain the same in interior chambers 148 located respectively in the lens mount 52a and hinge support 54. The eyewear hinge 140 may omit or include the security slot 66 and security ledge 68 described above.

Figure 31:
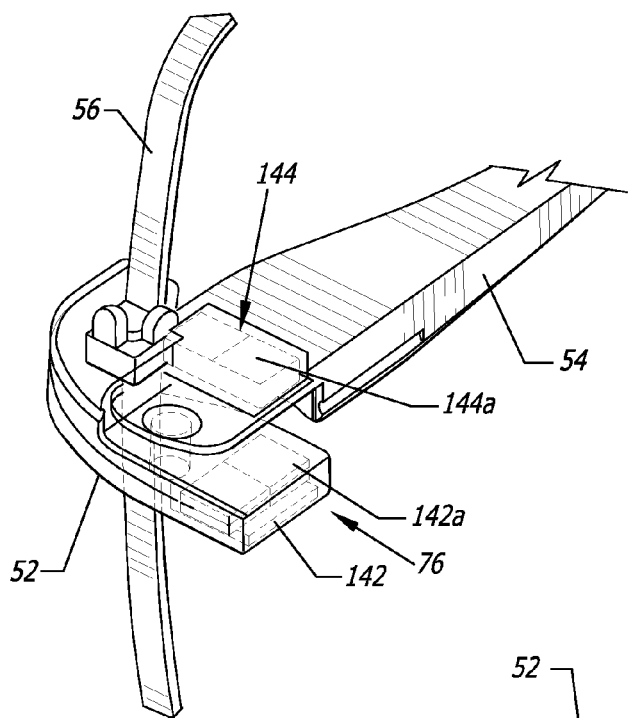
FIG. 31 is a close-up view of the eyewear hinge of FIG. 29, illustrated in a closed position.

As shown in FIG. 31, the first magnetic body 142 and second magnetic body 144 are not superposed in any manner when the eyewear hinge 140 is in the closed position 76. Based upon the described configuration of the polarities of the magnetic bodies 142, 144 the two poles that are closest to each other 142a, 144a are of identical polarity such that they would repel each other and help retain the eyewear hinge 140 in a closed position. Preferably, the magnetic force is strong enough to prevent the eyewear hinge 140 from falling into an open position 74 through the force of gravity. However, a user could easily overcome the repellant magnetic force to move the eyewear hinge 140 in an open position 74.

Figure 32:
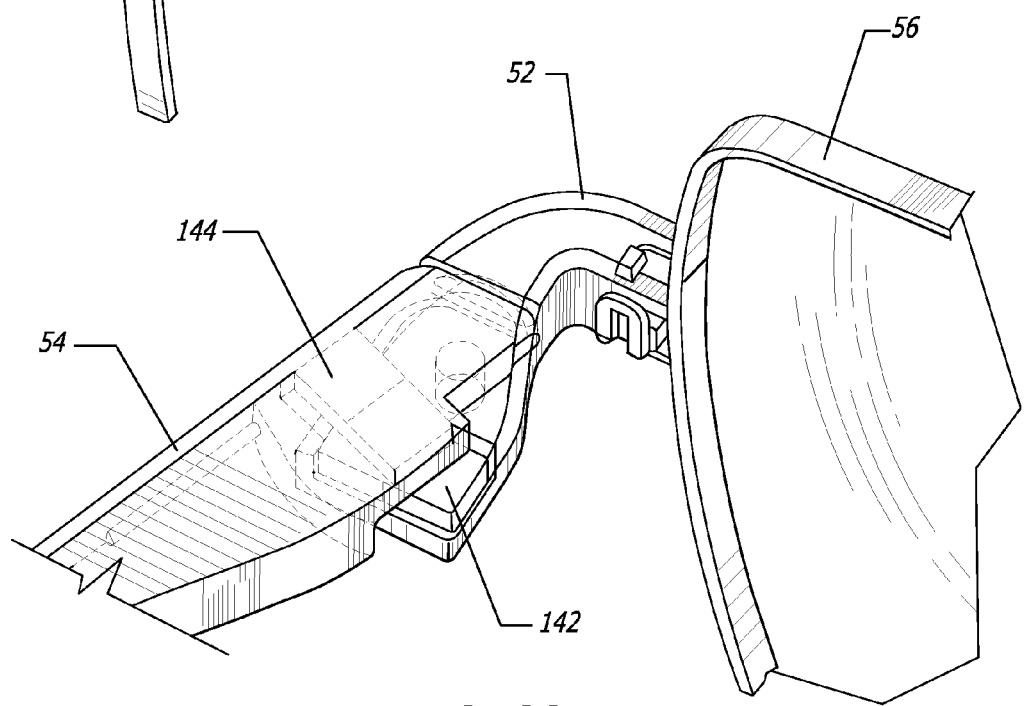
FIG. 32 is a close-up view of the eyewear hinge of FIG. 29 illustrated in an extended open position.

FIG. 32 illustrates a situation in which the eyewear hinge 140 has been pushed beyond the open position 74. In this instance, the attractive force of the magnetic bodies 142, 144 would be sufficient to "snap" the eyewear hinge 140 back into the open position 74 such that the hinge support 54 and earpiece 60 are in an appropriate position for a person to wear the glasses 58.

Figure 33:
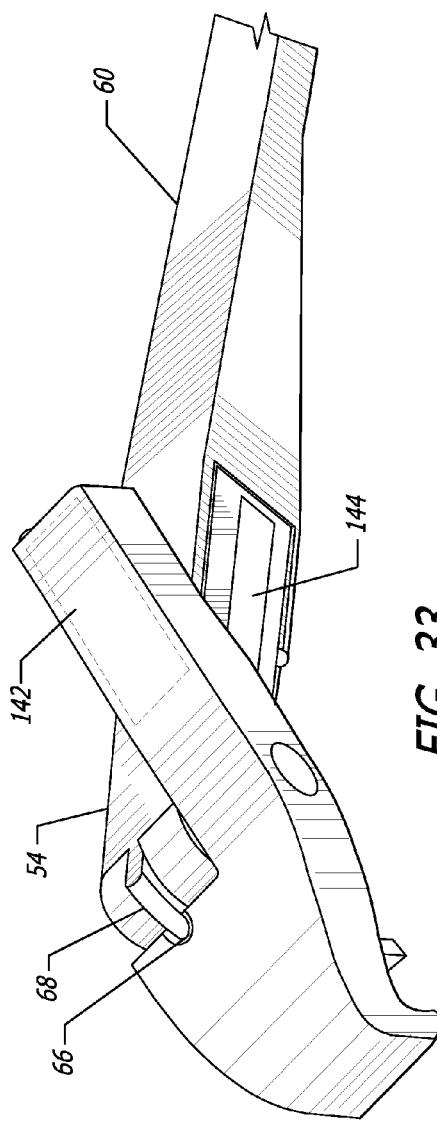
FIG. 33 is a lowered perspective view of an alternate embodiment of the eyewear hinge of the present invention, illustrating longitudinal rectangular magnets.
Figure 34:
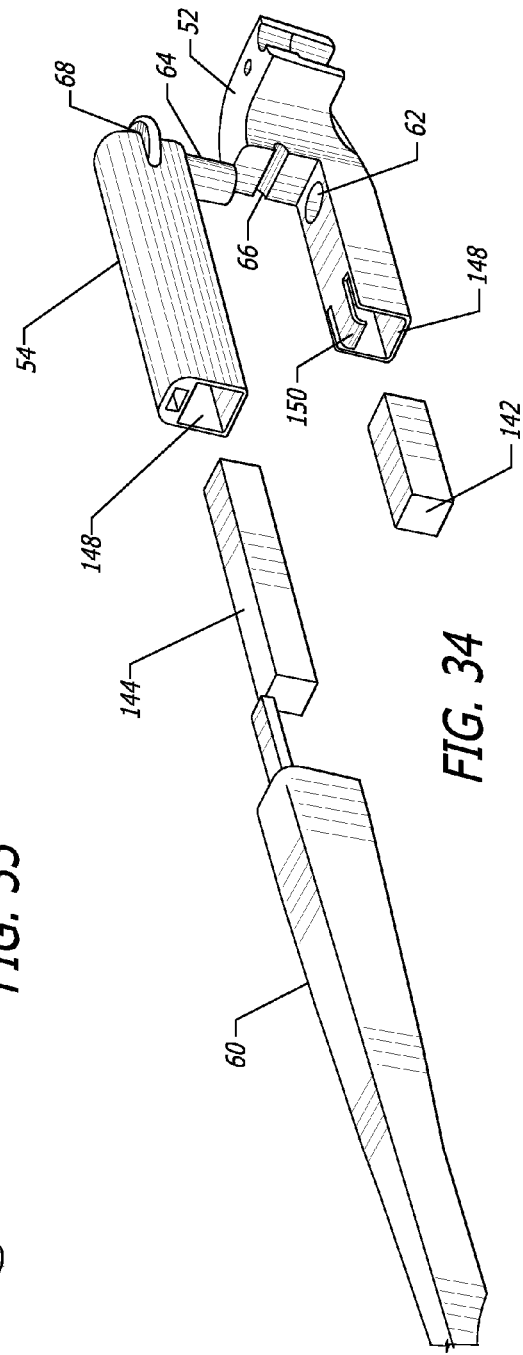
FIG. 34 is an exploded view of the eyewear hinge of FIG. 33.
Figure 35:
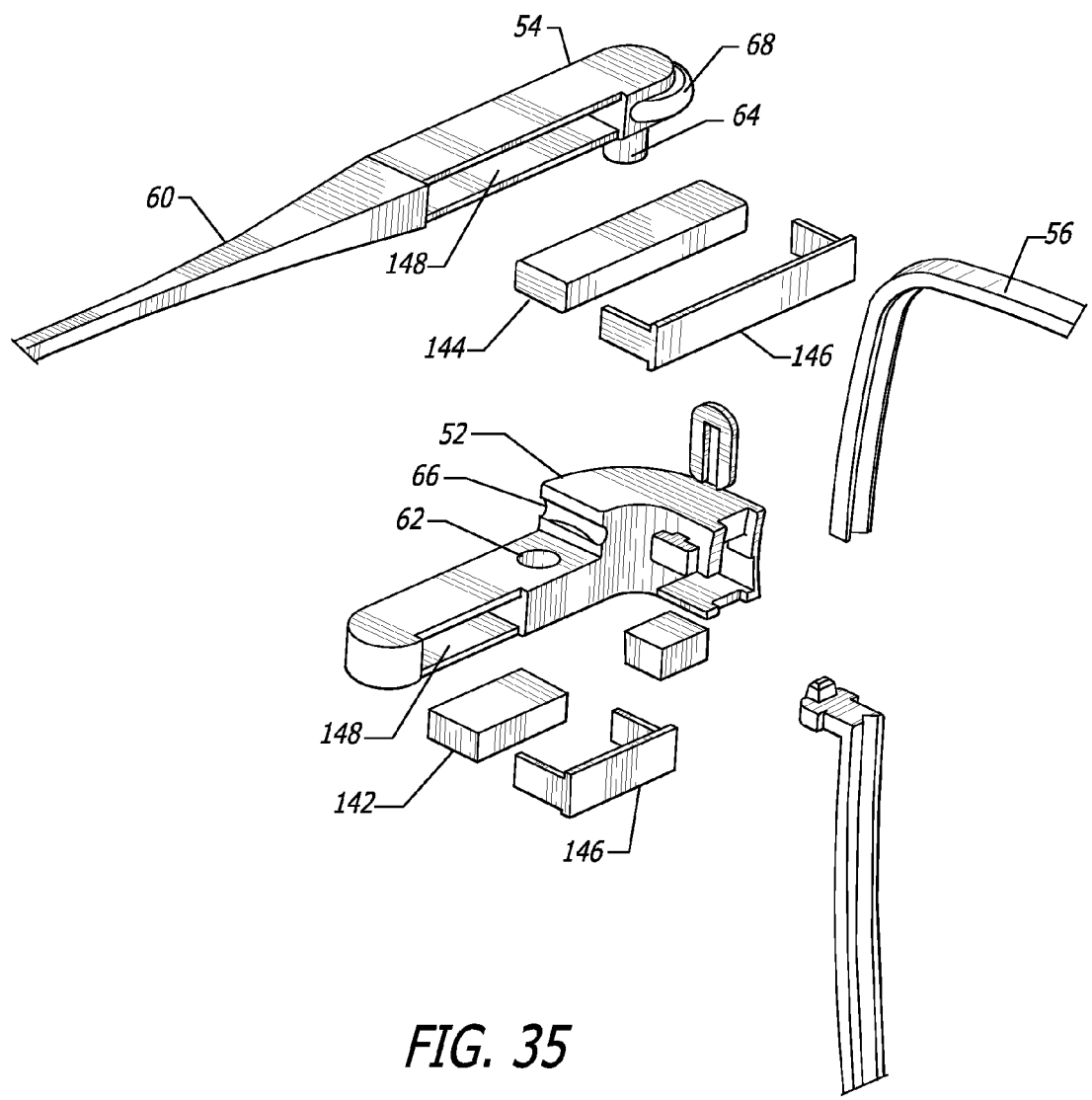
FIG. 35 is an exploded view of an alternate embodiment of the eyewear hinge of FIG. 33.
Figure 36:
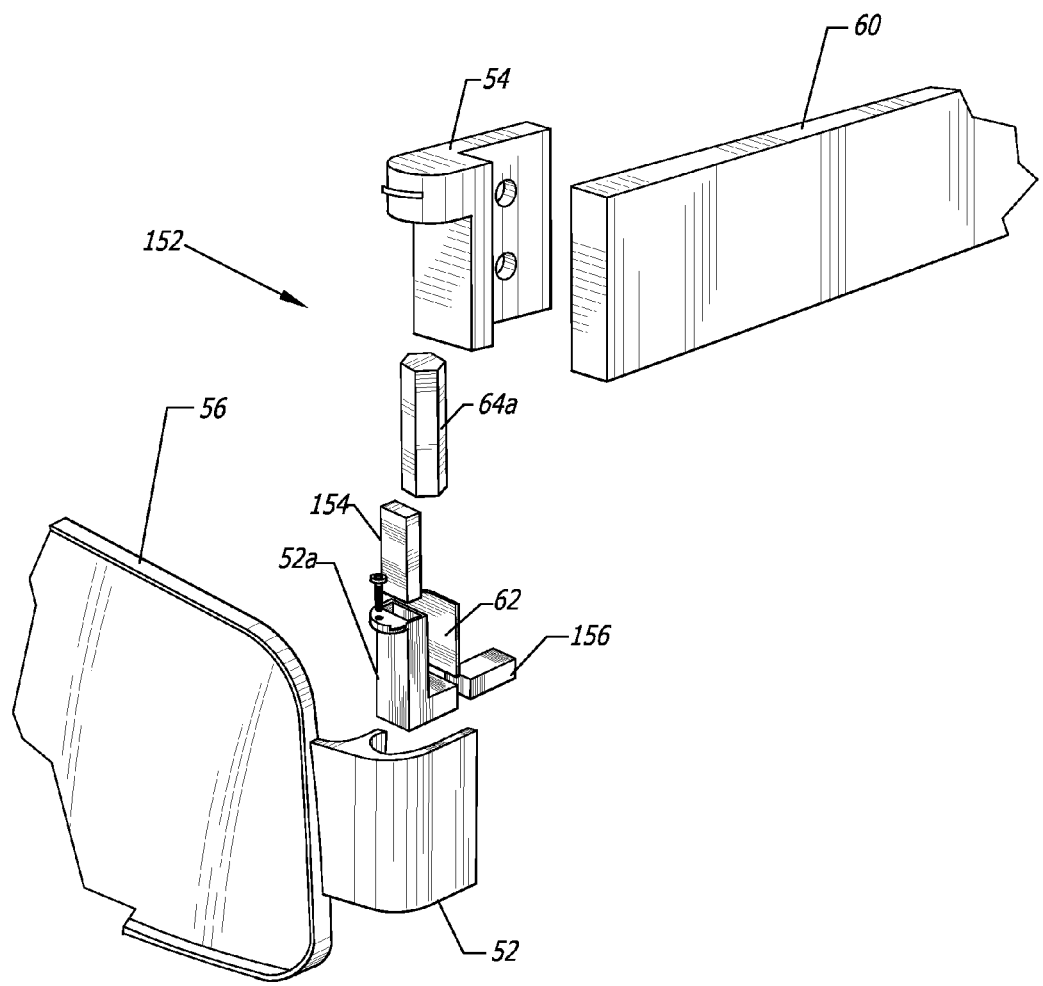
FIG. 36 is an exploded view of an alternate embodiment of the eyewear hinge of the present invention illustrating a hexagonal hinge post.

FIGS. 33 and 34 illustrate yet another embodiment of this eyewear hinge 140 wherein the magnetic bodies 142, 144 are longitudinally disposed within the lens mount 52 and the hinge support 54. In this configuration, the second magnetic body 144 is inserted into an interior chamber 148 on the hinge support 54. The earpiece 60 is then attached to the hinge support 54 in any manner known to those skilled in the art. The first magnetic body 142 is inserted into an interior chamber 148 on the lens mount 52. In this instance, the lens mount 52 includes a retaining clip 150 to securely hold the magnetic body 142 therein. Alternatively, FIG. 35 illustrates another variation of the longitudinally disposed magnetic bodies 142, 144, wherein the same are held within the interior chambers 148 by removable covers 146. The longitudinally disposed magnetic bodies 142, 144 operate in a similar manner to those magnetic configurations described above.

FIGS. 36-40 illustrate another alternate embodiment of the eyewear hinge 152 wherein the hinge post 64a is hexagonal in shape and the hinge receiver 62 is square in shape. The hexagonal hinge post 64a is preferably made from a material that interacts with magnetic fields so as to engage the magnetic bodies disposed within the lens mount 52. As illustrated, the hexagonal hinge post 64a may be removable from the hinge support 54.

Figure 37:
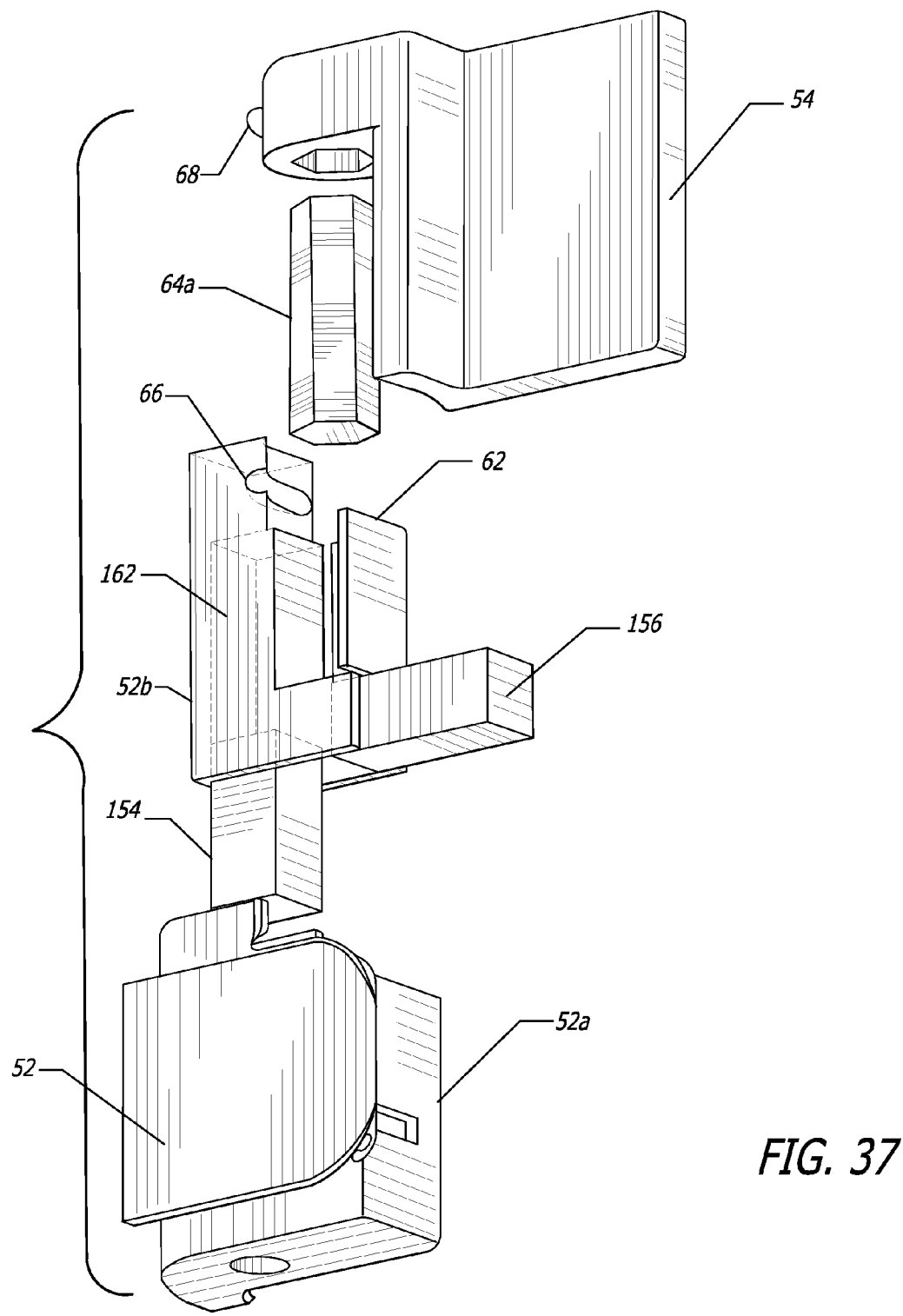
FIG. 37 is another exploded view of the eyewear hinge of FIG. 36.

In this embodiment, the eyewear hinge 152 includes a generally square hinge receiver 62. A vertical magnet 154 is disposed adjacent to the hinge receiver 62 and a horizontal magnet 156 is disposed beneath the hinge receiver 62. This embodiment of the eyewear hinge 152 may or may not include the security slot 66 and security ledge 68 described above. FIG. 37 illustrates a configuration of this embodiment that includes the security slot 66 and security ledge 68.

The magnetic field of the horizontal magnet 156 assists in retaining the hexagonal hinge post 64a in the hinge receiver 62. The vertical magnet 154 attracts one of the multiple sides of the hexagonal hinge post 64a against the side wall of the hinge receiver 62. This attraction by the vertical magnet 154 helps to retain the hinge support 54 in a particular rotation relative to the lens mount 52. Preferably, the hexagonal hinge post 64a and the hinge receiver 62 are sized such that at least two sides of the hexagonal hinge post 64a are in contact with the inner walls of the hinge receiver 62 at all times. The hexagonal hinge post 64a is able to rotate within the hinge receiver 62 because one wall of the hinge receiver 62 allows for a slight outward flexing. The security slot 66 and security ledge 68 may be included in this embodiment 152 and function as described above.

Figure 38:
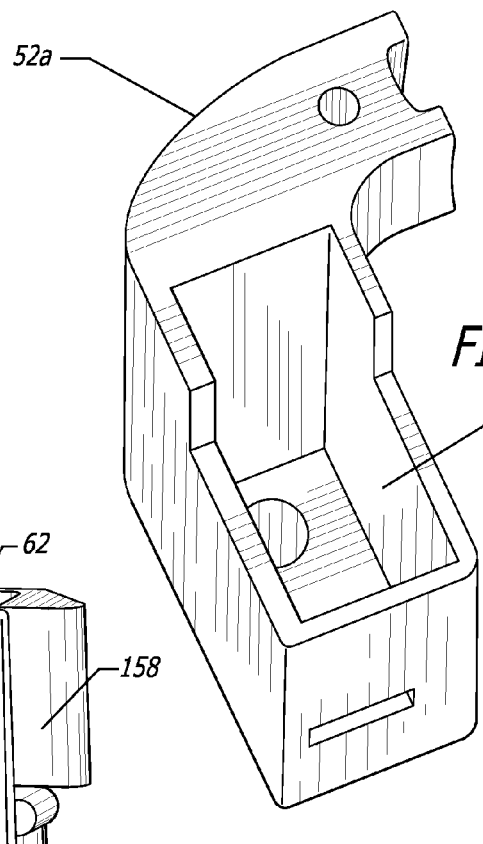
FIG. 38 is a top perspective view of a lens mount of the present invention.
Figure 39:
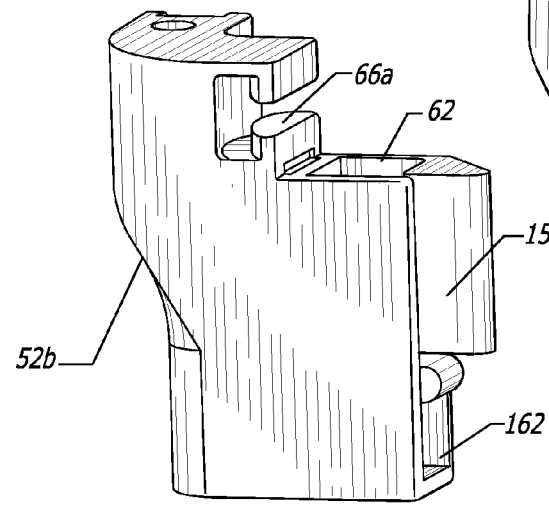
FIG. 39 is a perspective view of a lens mount insert for use with the lens mount base of FIG. 38.

As shown in FIG. 37, the lens mount 52 may include a base 52a separable from the mount 52, as well as, a removable insert 52b configured to be disposed within the base 52a. The removable nature of the insert 52b facilitates the insertion of the vertical magnet 154 and the horizontal magnet 156 and the ultimate assembly of the same with the base 52a. FIGS. 38 and 39 illustrate more clearly the configuration of the base 52a and the insert 52b. As shown in FIG. 38, the base 52a includes a cavity 160 for receipt of the insert 52b. As shown in FIG. 39, the removable insert 52b includes a resilient tab 158, such that when the insert 52b is set in the cavity 160 the resilient tab 158 is pressed slightly inward such that its resilient nature exerts a force on the walls of the cavity 160. The insert 52b further includes an interior chamber 162 configured for receipt of the vertical magnet 154. A corresponding vertical chamber 162 for the horizontal magnet 156 is shown in FIG. 37.

Figure 40:
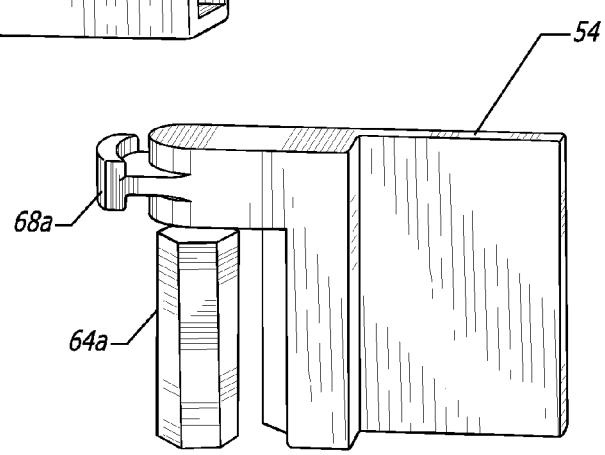
FIG. 40 is a perspective view of an alternate embodiment of a hinge support of the present invention.
Figure 41:
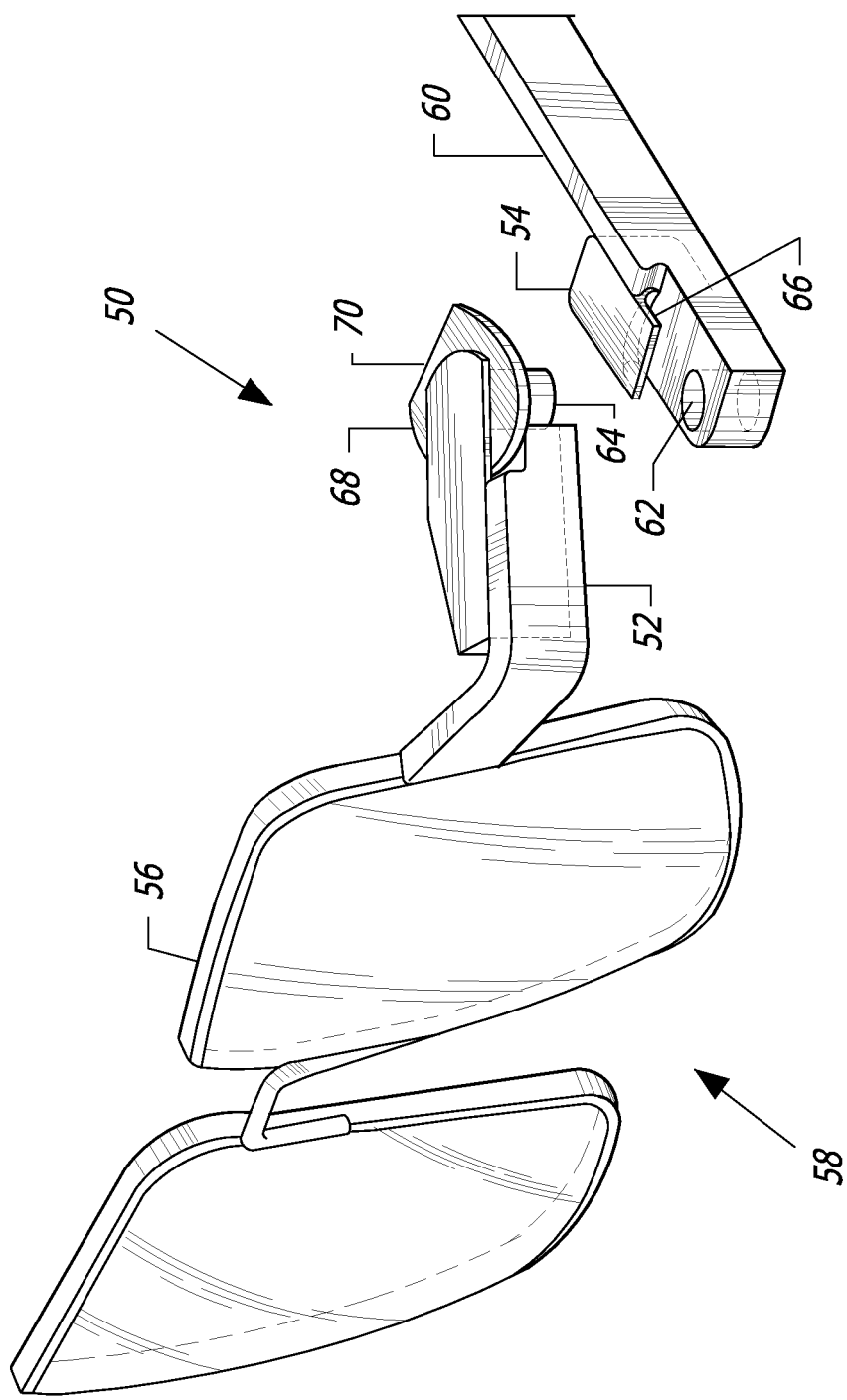
FIG. 41 is a partially exploded view of an alternate embodiment of the eyewear hinge of FIG. 1.

FIGS. 39 and 40 illustrate another alternate embodiment of the security slot 66 and security ledge 68. In this embodiment, the security ledge 68 preferably has a T-shaped cross-section such that the security ledge 68a appears as illustrated in FIG. 40. The security slot 66 preferably has a matching T-shaped cross-section such that the security slot 66a appears as illustrated in FIG. 39. This T-shaped cross-section of the slot 66a and ledge 68a provide additional retention force of the hinge support 54 in the lens mount 52 when in the open position 74.

FIGS. 41-45 generally illustrate another preferred embodiment of the inventive eyewear hinge, generally referred to by reference numeral 50. In this embodiment of the eyewear hinge 50, the structures that connect the earpiece 60 to the lens mount 52 are swapped from the embodiment of FIGS. 1-5. Specifically, earpiece 60 includes the hinge receiver 62 on the hinge support 54 that is configured to receive a hinge post 64 from the lens mount 52. As above, the hinge receiver 62 and hinge post 64 are preferably configured to have a cylindrical or similar shape that permits pivotal rotation of the hinge support 54 relative to the lens mount 52. The hinge support 54 also includes a security slot 66 that is configured to receive and engage a security ledge 68 from the lens mount 52 as the hinge support 54 is pivotally rotated relative to the lens mount 52.

The security slot 66 is disposed on the hinge support 54 in an area proximate to the hinge receiver 62. Preferably, the security slot 66 is disposed in an area above the hinge receiver 62 within an area representing an arc of rotation about the hinge receiver 62. In the illustrated embodiment, the security slot 66 is formed in a vertical wall adjacent to the hinge receiver 62 and that extends above the same. A person skilled in the art will realize that the structure of the security slot 66 may be configured in other ways to accomplish the same goals.

The security ledge 68 is disposed on the lens mount 52 in an area above the hinge post 64. Preferably, the security ledge 68 is disc-shaped and extends around a vertical wall on the lens mount 52 in an area above the hinge post 64. The security ledge 68 should extend into an area representing an arc of rotation of the hinge support 54 about the lens mount 52. With both the security slot 66 and security ledge 68 extending into this arc of rotation, the two components can engage and perform the intended security functions.

The security ledge 68 is generally circular or disc-shaped so as to engage the security slot 66 through a wide range of pivotal rotation. The security ledge 68 preferably includes a discontinuity or flattened portion 70 to permit attachment and/or removal of the hinge support 54 to or from the lens mount 52 without interference from the security slot 66 and the security ledge 68.

Figure 42:
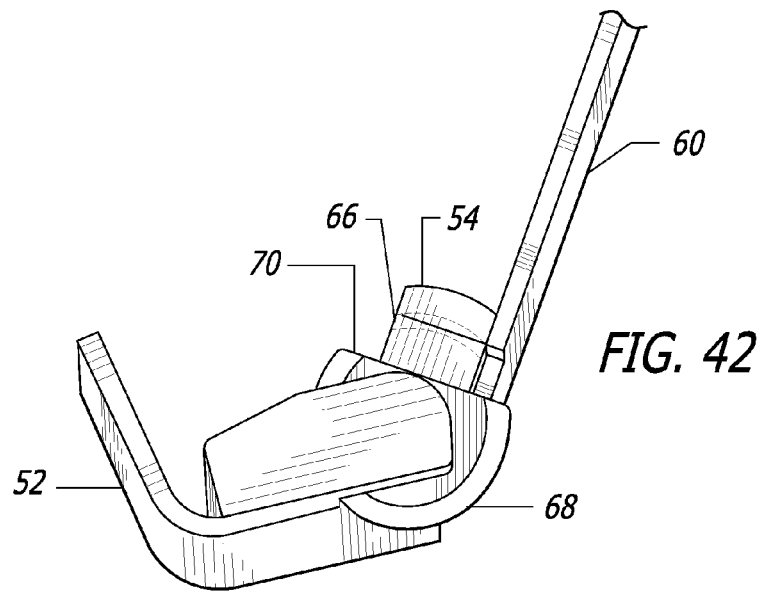
FIG. 42 is an elevated view of the eyewear hinge of FIG. 41, illustrating attachment of the pivoting earpiece to the lens mount.
Figure 43:
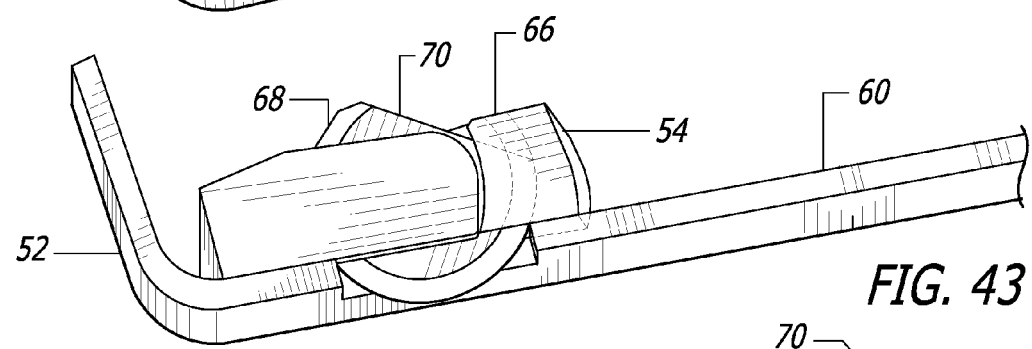
FIG. 43 is an elevated view of the eyewear hinge of FIG. 41, illustrating the pivoting earpiece in an open position.
Figure 44:
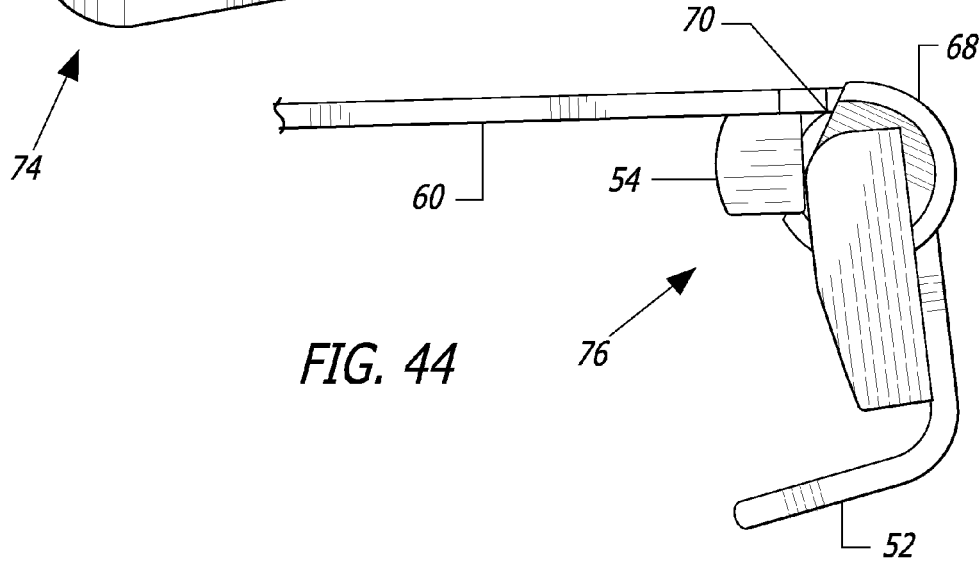
FIG. 44 is a top view of the eyewear hinge of FIG. 41, illustrating the pivoting earpiece in a closed position.

FIG. 42 illustrates a removal position or orientation of the hinge support 54 with respect to the lens mount 52. As illustrated, the flattened portion 70 of the security ledge 68 bypasses the security slot 66 to provide for insertion of the hinge post 64 into the hinge receiver 62. FIG. 43 illustrates an open position where the earpiece 60 is extended open such that a person may wear the glasses 58 with the earpiece 60 positioned over their ear. In this open position 74, the security ledge 68 engages the security slot 66 such that the hinge support 54 is retained flush against the lens mount 52. Similarly, FIG. 44 illustrates a closed position 76 in which the earpiece 60 is folded across the glasses 58. In this closed position 76, the security ledge 68 again engages the security slot 66 such that the hinge support 54 is retained securely against the lens mount 52.

Figure 45:
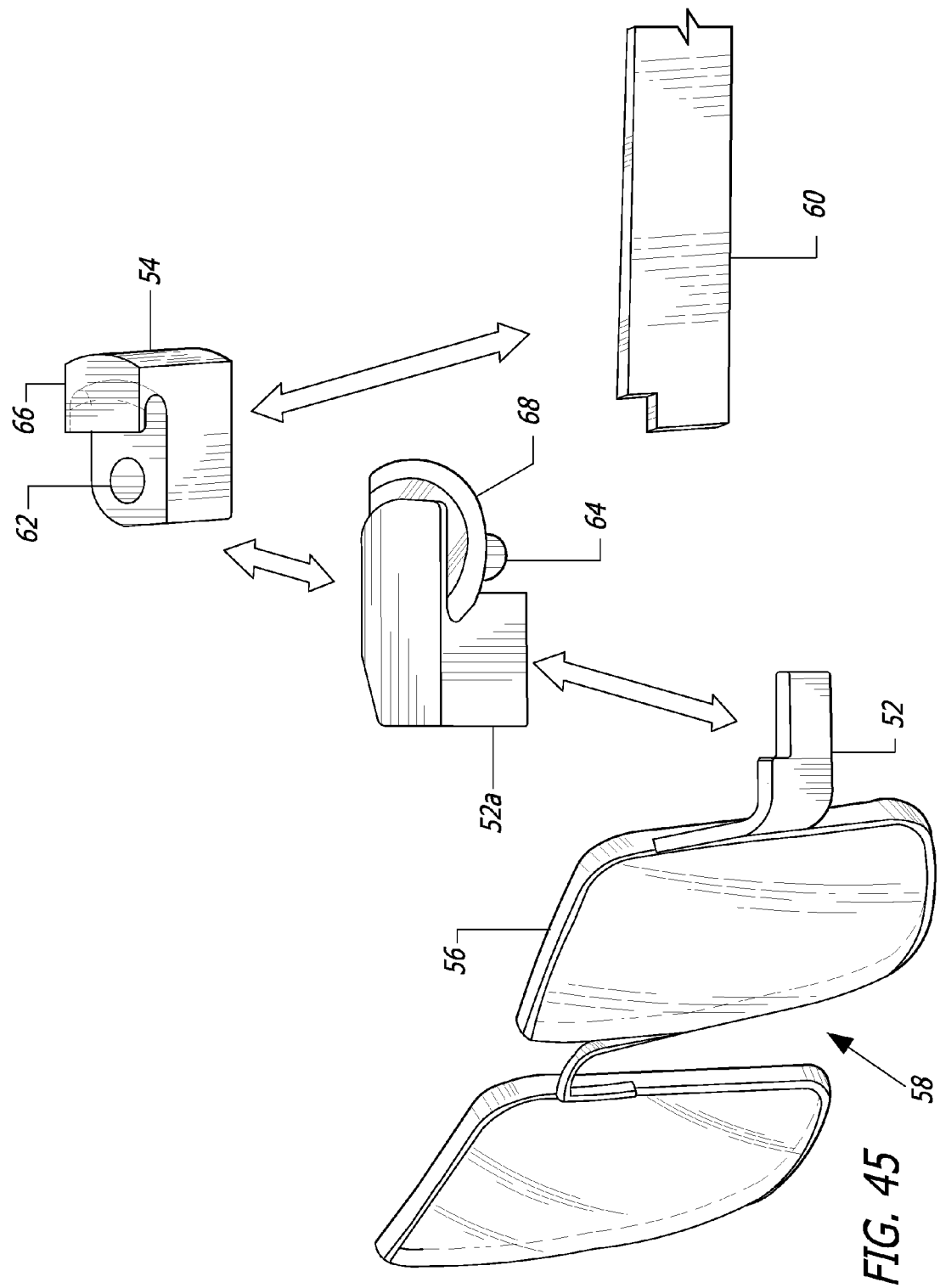
FIG. 45 is an exploded view of the eyewear hinge of FIG. 41 illustrating the relative positioning and assembly of the various components.

As illustrated in FIG. 45, the lens mount 52 may include a base 52a that is removable from the lens mount 52. As with the hinge support 54 and earpiece 60, the lens mount 52 and base 52a may be permanently attached or removably attached in manners known by those skilled in the art. Where the base 52a is removable from the lens mount 52, it is preferably the base 52a that includes the hinge post 64 and security ledge 68 of this embodiment.

Figure 46:
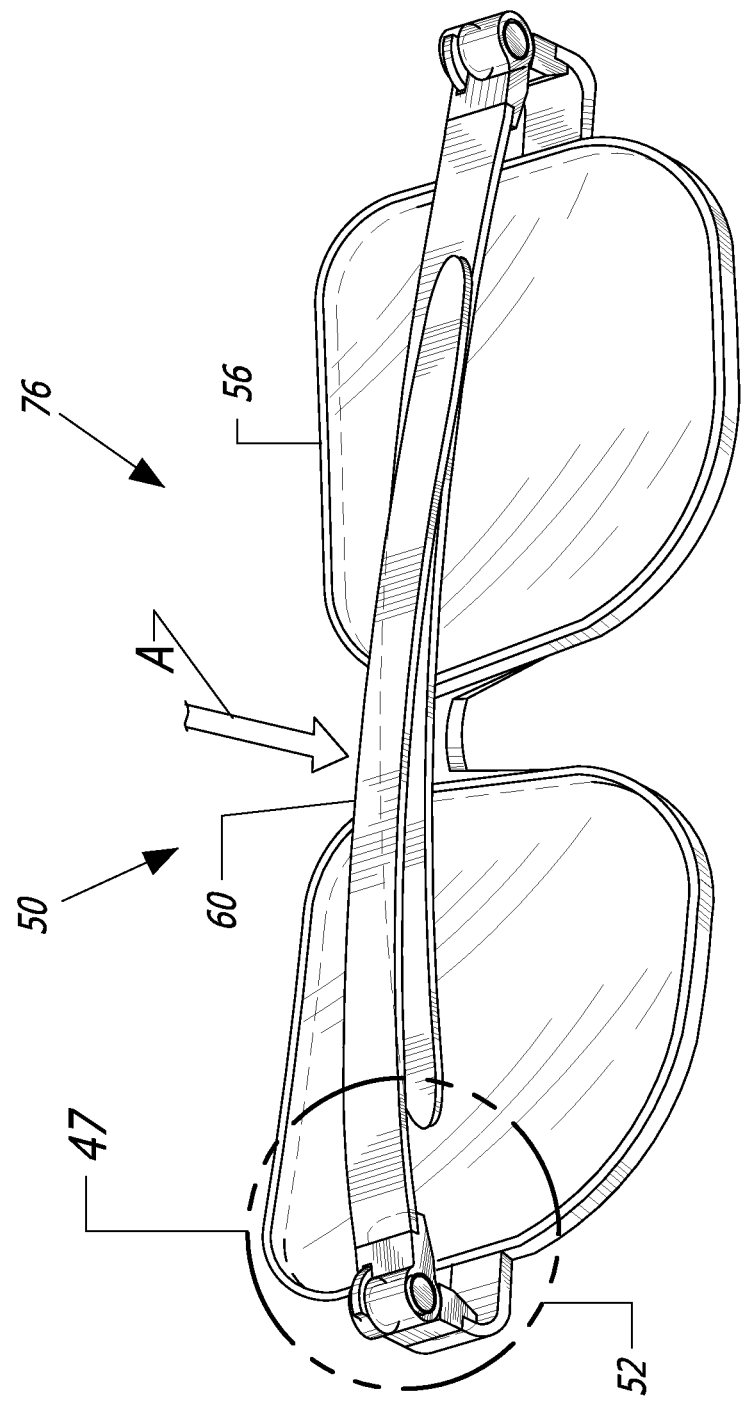
FIG. 46 is a perspective view of a pair of glasses including an alternate embodiment of the eyewear hinge of the present invention.
Figure 47:
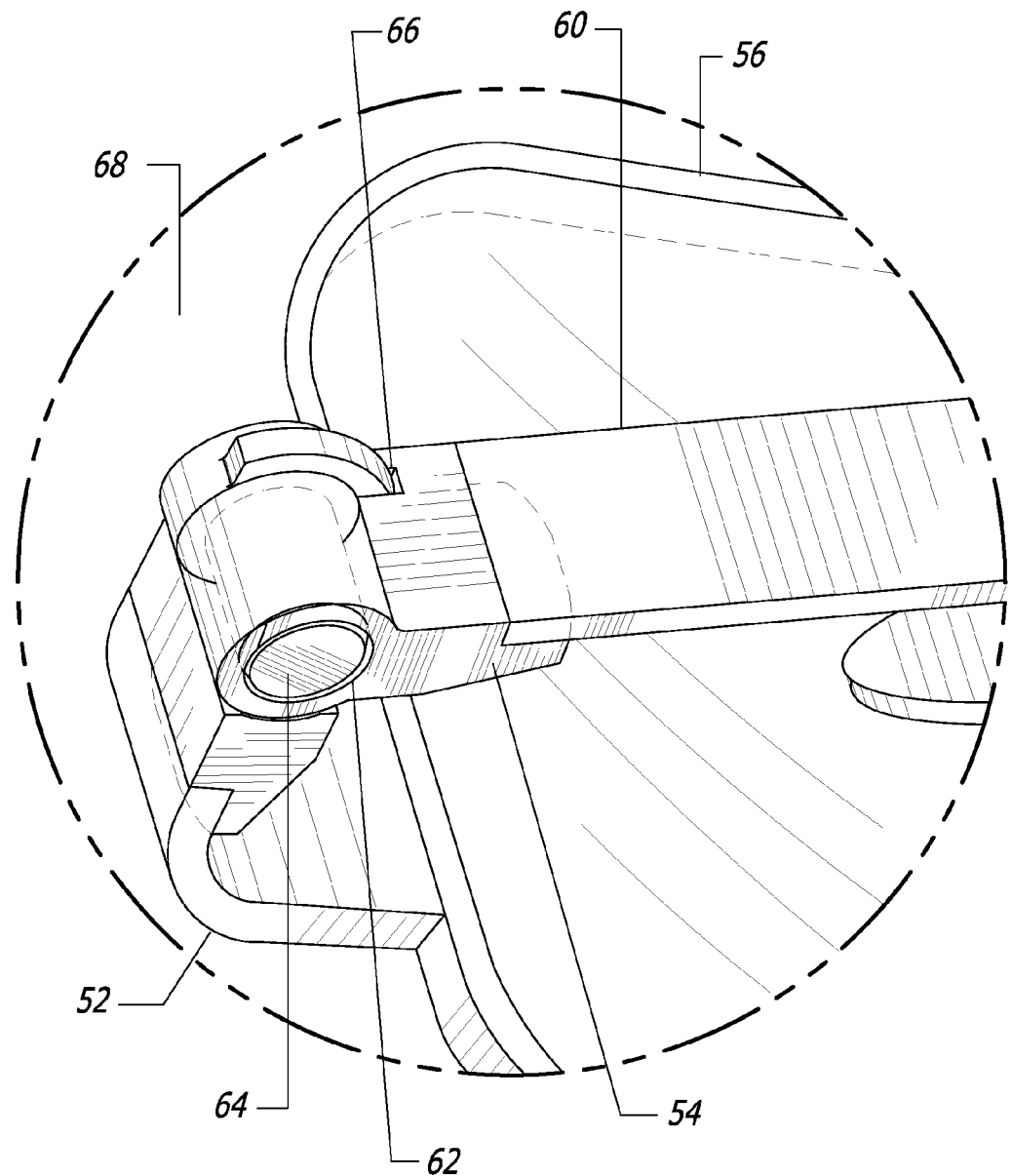
FIG. 47 is a close up view of the eyewear hinge of FIG. 46 indicated by circle 47.

FIGS. 46-49 illustrate an additional security feature of another embodiment configured to help retain the earpiece 60 on the glasses 58, while permitting removal of the same generally in the closed position 76. As illustrated in the close-up of FIG. 47 and generally in FIG. 44, a portion of the security ledge 68 resides within the security slot 66 when the earpiece 60 is in the closed position 76 to hold the lens mount 52 and hinge support 54. However, as shown in FIG. 46 it is possible to push the earpiece 60 beyond this closed position 76 as indicated by arrow A.

Figure 48:
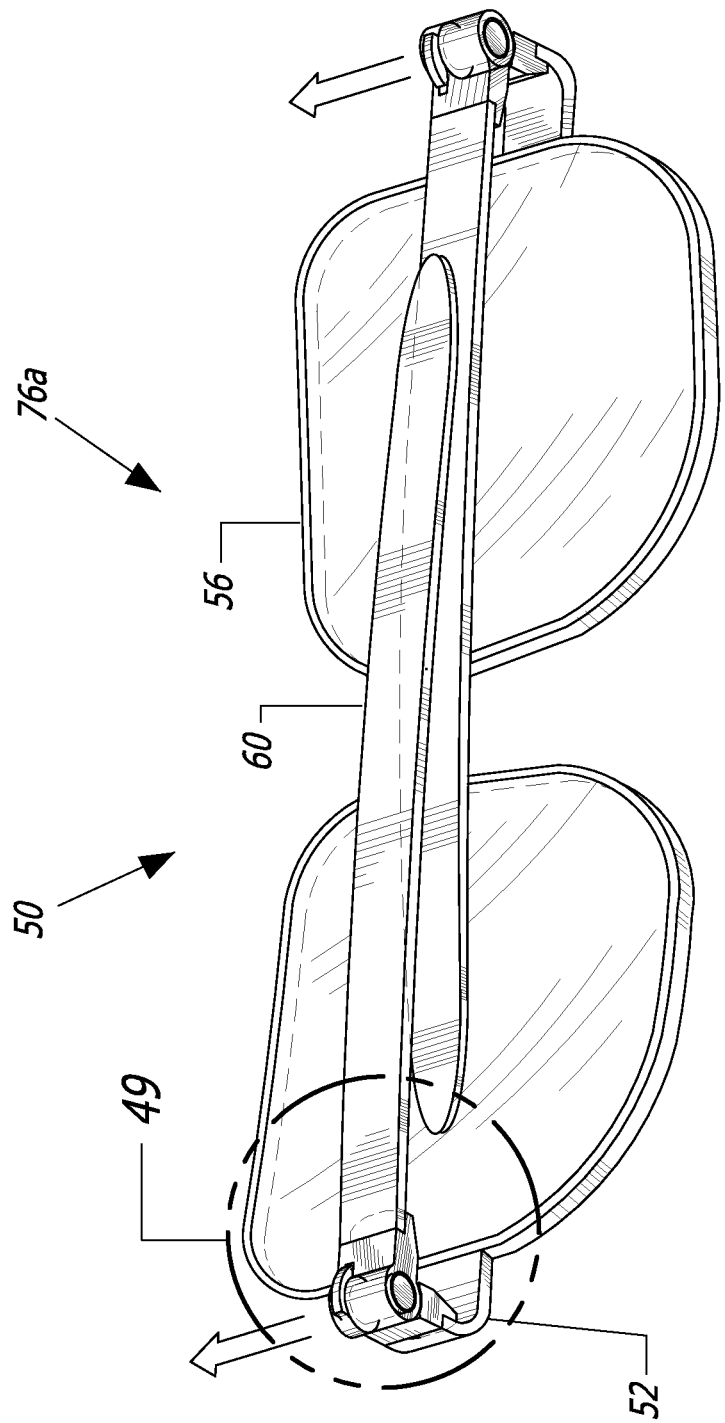
FIG. 48 is a perspective view of a pair of glasses including the eyewear hinge of FIG. 46.
Figure 49:
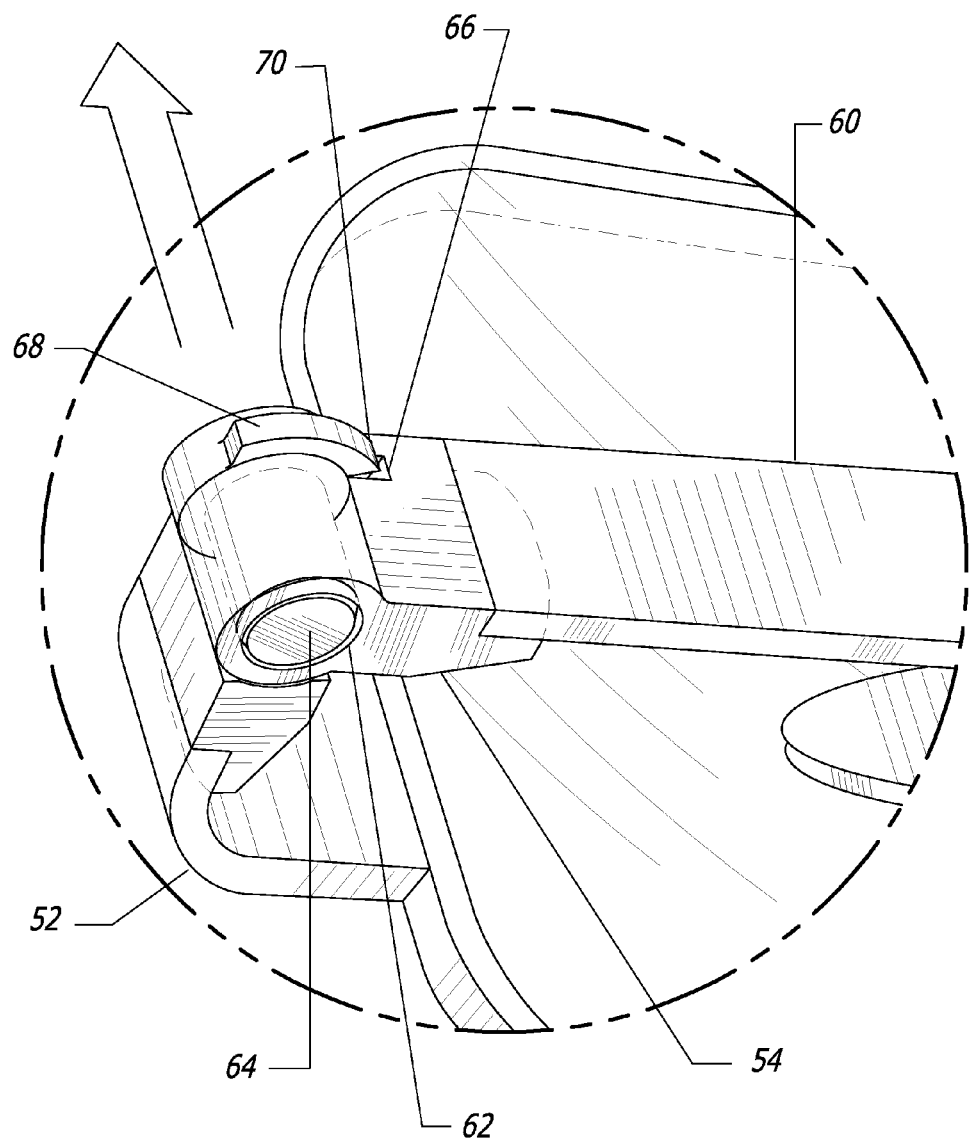
FIG. 49 is a close up view of the eyewear hinge of FIG. 48 indicated by circle 49.

FIGS. 48-49 generally show the earpiece 60 pushed into the beyond closed position 76a. This beyond closed position 76a relies upon a flexible nature of the earpiece 60 that in the standard closed position 76 has a distal end contact the opposite lens 56 or opposite earpiece 60. This contact generally prevents the earpiece 60 from achieving the beyond closed position 76a without a pushing force in the direction of arrow A.

In the beyond closed position 76a, a discontinuity 70 in the security ledge 68 completely removes the same from the security slot 66. When the security ledge 68 is outside of the security slot 66, the hinge post 64 may be removed from the hinge receiver 62 by moving the lens mount 52 in the direction of arrow B relative to the hinge support 54. This is configuration is intended as an alternative to the embodiment of FIGS. 41-45 such that a removal position is not engaged during normal opening and closing of the earpiece 60 relative to the lenses 56.

Figure 50:
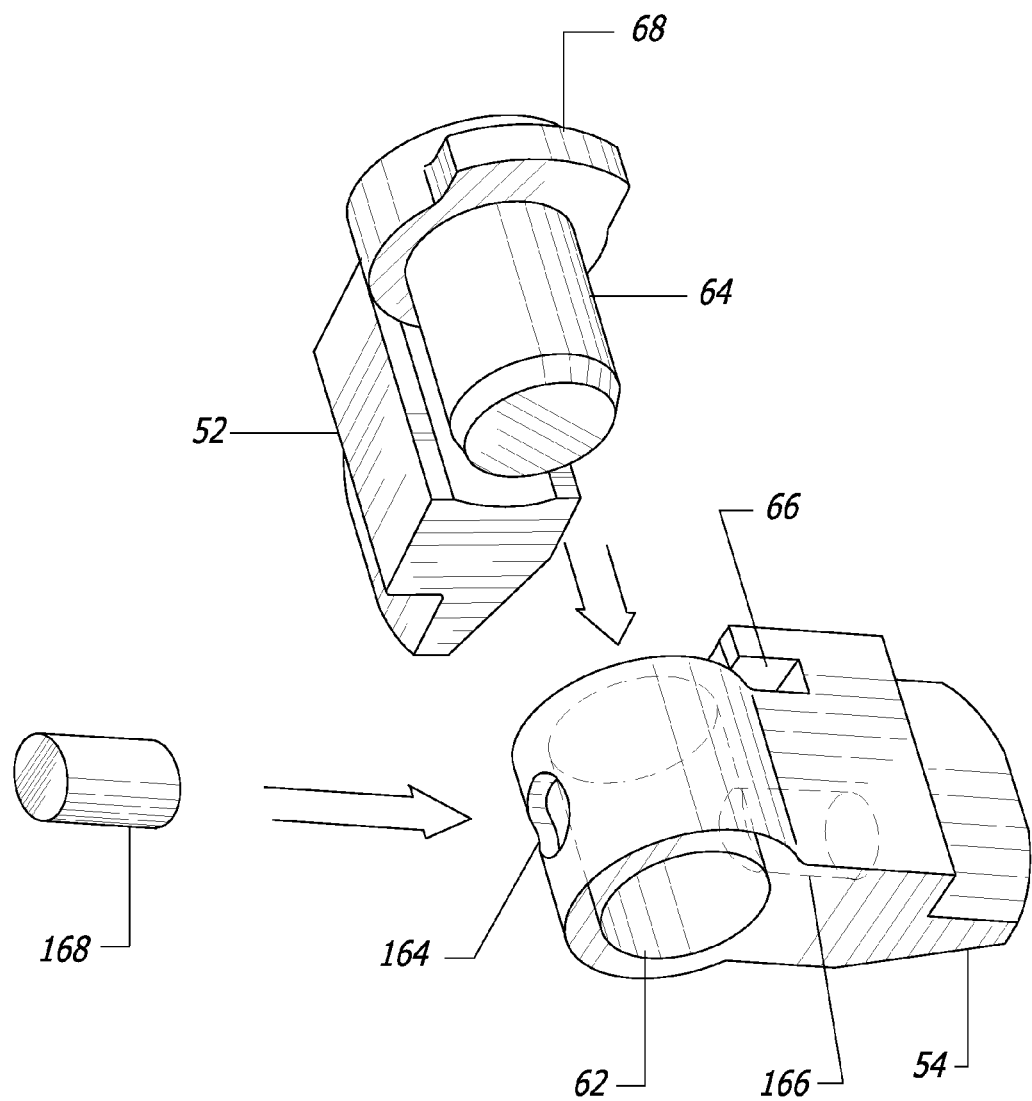
FIG. 50 is an exploded view of another alternate embodiment of the eyewear hinge of the present invention.
Figure 51:
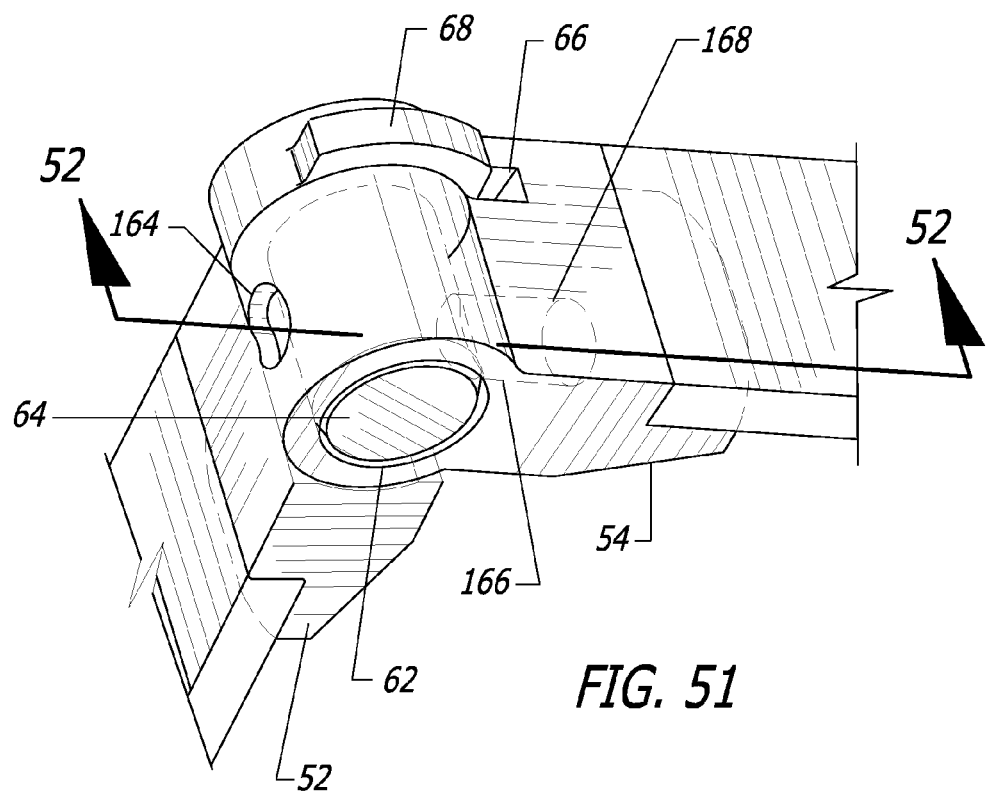
FIG. 51 is a partial perspective view of an assembled version of the eyewear hinge of FIG. 50.
Figure 52:
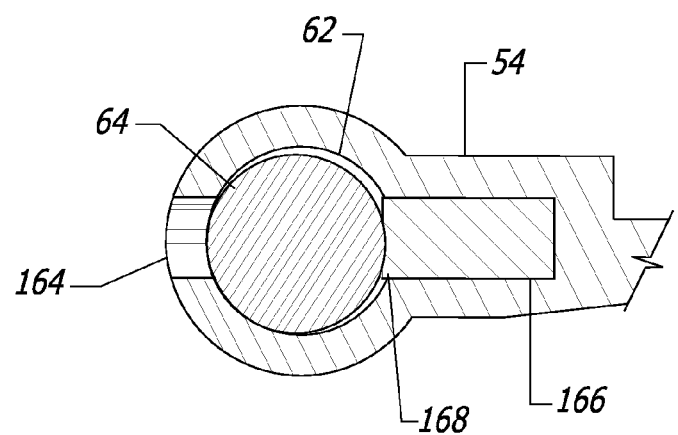
FIG. 52 is a cross-section view of the eyewear hinge of FIG. 51 taken along line 52-52 thereof.

FIGS. 50-52 illustrate an alternate embodiment of the inventive hinge 50, wherein the lens mount 52 and hinge support 54 are held together by a friction element. Specifically, the hinge support 54 includes a port 164 and inner chamber 166 that provide a pathway transverse to the hinge receiver 62. This pathway is configured to receive a friction element 168 through the port 164 and into the inner chamber 166. The port 164, inner chamber 166, and friction element 168 are preferably the same general shape, i.e., cylindrical, square, rectangular, etc., such that they may easily fit together or accommodate insertion of the friction element 168.

When placed in the inner chamber 166, the friction element 168 preferably extends slightly into the hinge receiver 62. This portion of the friction element 168 that extends into the hinge receiver 62 makes contact with the hinge post 64 when the same is inserted into the hinge receiver 62. As illustrated in FIG. 52, the friction element 168 pushes the hinge post 64 against the opposite wall of the hinge receiver 62. This configuration of the friction element 168, hinge post 64, and hinge receiver 62 create a friction-fit relationship between the elements that prevents or reduces the occurrence of accidental or involuntary separation of the hinge post 64 and hinge receiver 62. The friction-fit relationship between the elements also helps to maintain the earpiece 60 in an open or closed position—or any position in between.

The friction element 168 is preferably made from a durable material, i.e., metal or plastic, that will withstand multiple openings and closings of the earpiece 60 without excessive wear or reduction. The lens mount 52 may also include a security ledge 68 that engages a security slot 66 on the hinge support 54. The security ledge 68 and security slot 66 are optional on this embodiment as the friction element 168 is generally sufficient to maintain the lens mount 52 and hinge support 54 together.

Figure 53:
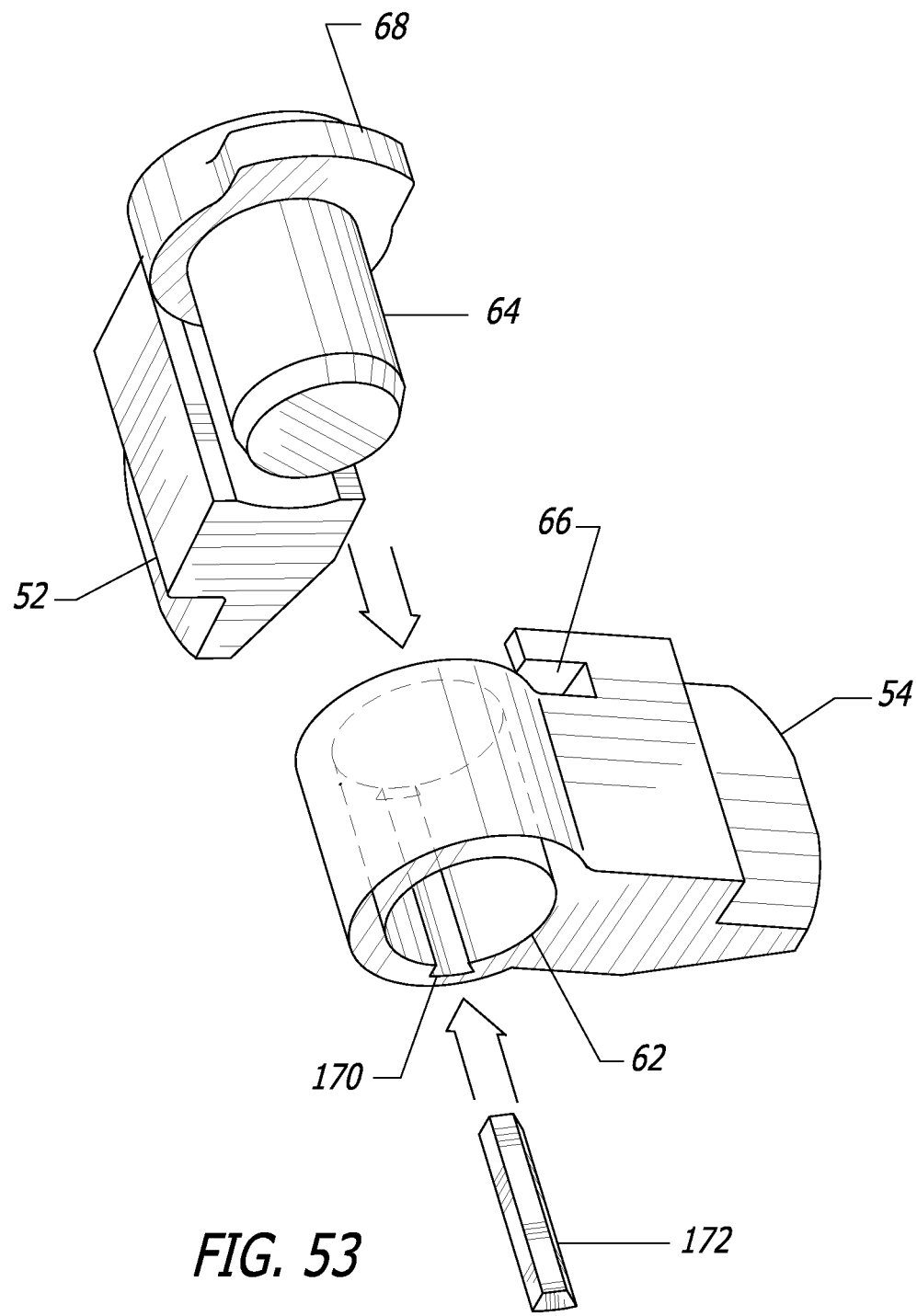
FIG. 53 is an exploded vice of another alternate embodiment of the eyewear hinge of the present invention.
Figure 54:
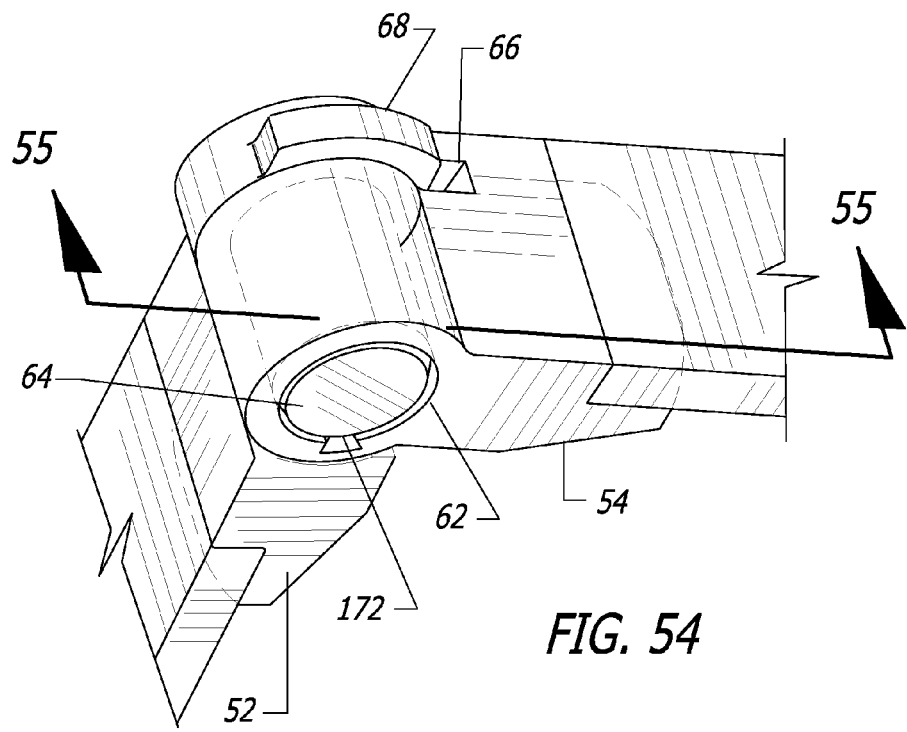
FIG. 54 is a partial perspective view of an assembled version of the eyewear hinge of FIG. 53.
Figure 55:
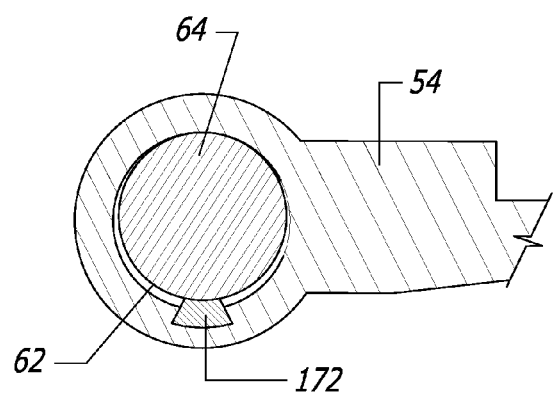
FIG. 55 is a cross-section view of the eyewear hinge of FIG. 53 taken along line 55-55 thereof.

FIGS. 53-55 illustrate an alternate embodiment of the inventive hinge 50 held together by a friction element. In this embodiment, the hinge support 54 includes a longitudinal slot 170 along the hinge receiver 62. A friction element 172 engages the slot 170 such that a portion of the friction element 172 extends into the hinge receiver 62. The slot 170 and friction element 172 are preferably configured to have a generally trapezoidal cross-section or similar shape. The shape of the slot 170 and friction element 172 must be such that the friction element 172 is reliably maintained in the slot 170 such that it will not accidentally or involuntarily fall out of the slot 170.

The portion of the friction element 172 that extends into the hinge receiver 62 makes contact with the hinge post 64 when the same is inserted into the hinge receiver 62. As illustrated in FIG. 55, the friction element 172 pushes the hinge post 64 against the opposite wall of the hinge receiver 62. This configuration of the friction element 172, hinge post 64, and hinge receiver 62 create a friction-fit relationship between the elements that prevents or reduces the occurrence of accidental or involuntary separation of the hinge post 64 and hinge receiver 62. The friction-fit relationship between the elements also helps to maintain the earpiece 60 in an open or closed position—or any position in between.

The friction element 172 is preferably made from a durable material, i.e., metal or plastic, that will withstand multiple openings and closings of the earpiece 60 without excessive wear or reduction. The lens mount 52 may also include a security ledge 68 that engages a security slot 66 on the hinge support 54. The security ledge 68 and security slot 66 are optional on this embodiment as the friction element 172 is generally sufficient to maintain the lens mount 52 and hinge support 54 together.

Figure 58:
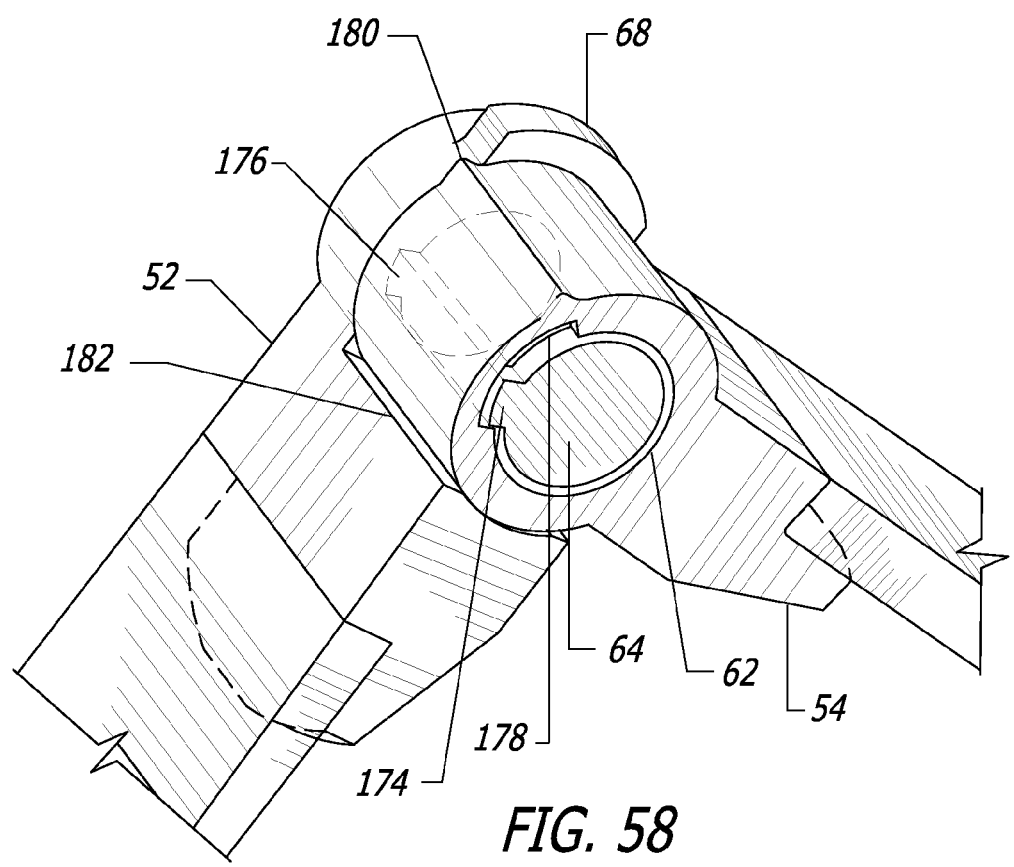
FIG. 58 is a perspective assembled view of the components of the eyewear hinge of FIGS. 56 and 57.

FIGS. 56-58 illustrate yet another embodiment of the hinge 50 of the present invention. This embodiment of the hinge 50 includes a locking lug 174 with a corresponding channel 176 and stop ledge 178. The locking lug 174 is preferably included on a bottom edge of the hinge post 64. When inserting the hinge post 64 into the hinge receiver 62, the locking lug 174 passes through a channel 176 that runs longitudinally along the hinge receiver 62. This channel 176 permits the hinge post 64 to be inserted into the hinge receiver 62 without hindrance. Near the bottom of the hinge receiver 62 is a stop ledge 178 that partially follows the curvature of the hinge receiver 62 adjacent to the channel 176. The stop ledge 178 is configured to permit rotation of the hinge post 64 within the hinge receiver 62 without hindrance by the locking lug 174. When the hinge post is rotated within the hinge receiver 62, the locking lug 174 passes along the stop ledge 178 following the curvature of the hinge receiver 62. At the same time, when the locking lug 174 passes along the stop ledge 178, the stop ledge 178 prevents removal of the hinge post 64 from the hinge receiver 62 as the locking lug 174 is prevented from passing longitudinally along the hinge receiver 62.

Optionally, this embodiment of the hinge 50 may include a security ledge 68 and security slot 66 as described above. This embodiment may also include a rotational stop 180. The rotational stop 180 preferably comprises a ridge or similar structure disposed longitudinally along an exterior surface of the hinge support 54. The rotational stop 180 engages a stop surface 182 on the lens mount 52 to prevent over-rotation of the hinge support 54 relative to the lens mount 52.

Figure 60:
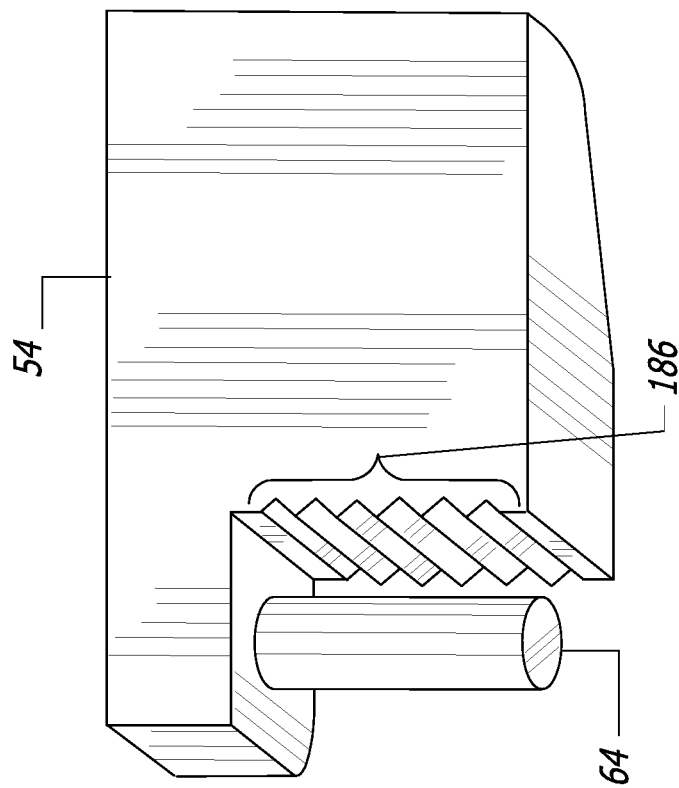
FIG. 60 is a perspective view of another component of the alternate embodiment of the eyewear hinge of FIG. 59.
Figure 59:
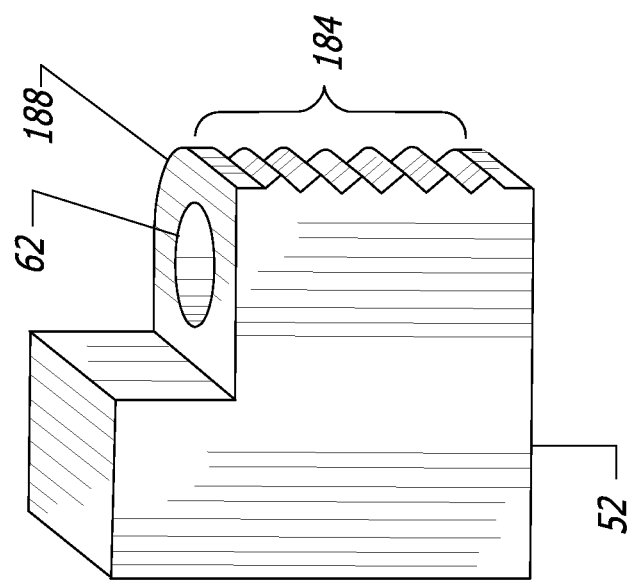
FIG. 59 is a perspective view of a component of an alternate embodiment of the eyewear hinge of the present invention.
Figure 61:
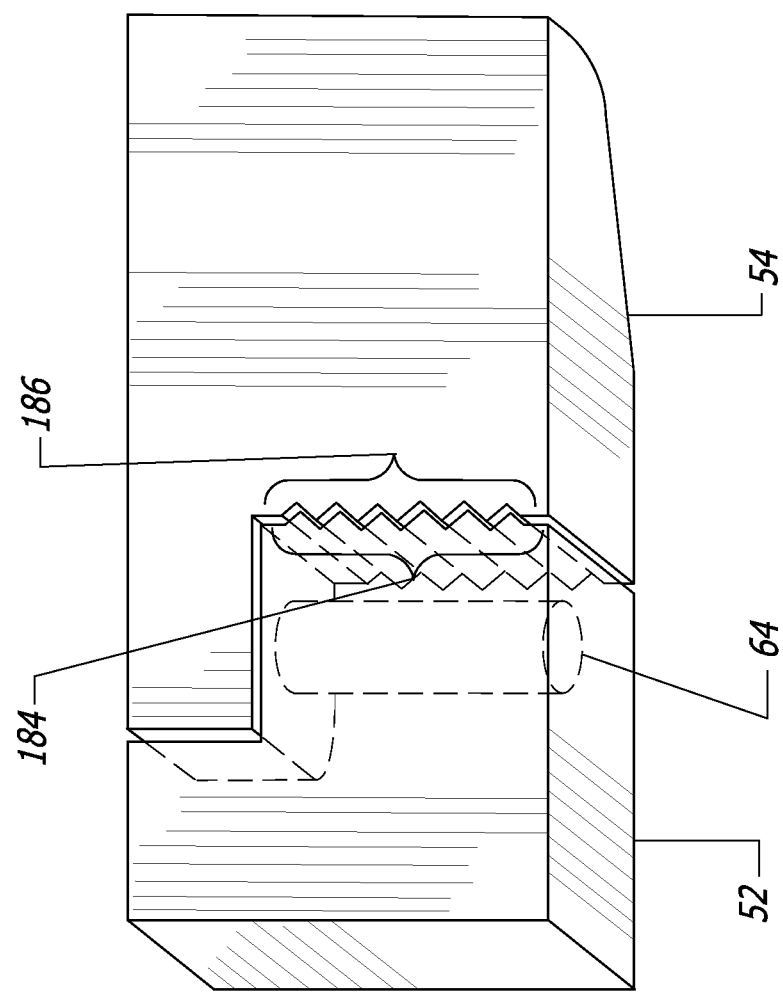
FIG. 61 is a perspective view of the components of the eyewear hinge of FIGS. 59 and 60 assembled together.

FIGS. 59-61 illustrate yet another embodiment of the inventive hinge 50. In this embodiment, the lens mount 52 includes a set of parallel ledges 184 on a surface of the lens mount 52 that faces the hinge support 54. The hinge support 54 also has a set of parallel ledges 186 on a surface behind the hinge post 64. In this way, the respective sets of parallel ledges 184, 186 come into engagement when the hinge post 64 is inserted into the hinge receiver 62 and the hinge support 54 is rotated into an open position relative to the lens mount 52. The sets of parallel ledges 184, 186 are preferably configured and oriented to engage as screw threads.

The sets of parallel ledges 184, 186 may be oriented horizontally or with a slight angle relative to the orientation of the lens mount 52 and hinge support 54. When at a slight angle, the sets of parallel ledges 184, 186 may cause a tightening down of the hinge post 64 in the hinge receiver 62. Regardless of whether the orientation is horizontal or slightly angled, the engagement of the sets of parallel ledges 184, 186 secures the hinge post 64 in the hinge receiver 62 and prevents removal of the same. The interior corner 188 of the lens mount 52 (relative to the complete set of glasses 58) is preferably rounded to facilitate the rotation of the hinge support 54 about the lens mount 52. The set of parallel ledges 184 preferably follows this rounded interior corner 188 to provide for additional securement of the hinge post 64 in the hinge receiver 62 except for when the earpiece 60 is in the closed position 76 or, more preferably, beyond closed position 76a.

Although several embodiments have been described in detail for purposes of illustration, various modifications may be made without departing from the scope and spirit of the invention. This includes where some embodiments have been described with particular structures on either the lens mount 52 or the hinge support 54. One skilled in the art will appreciate that any of the above described components may be positioned on either the lens mount 52 or hinge support 54 and still function as described and intended so long as corresponding parts are oriented and configured as described. Accordingly, the invention is not to be limited, except as by the appended claims.

What is claimed is:

1. An eyewear hinge for removably connecting an earpiece to a lens frame, the eyewear hinge comprising:
   a lens mount attached to the lens frame and having a hinge receiver and a security slot;
   a hinge support attached to the earpiece, the hinge support having a hinge post removably insertable into the hinge receiver so as to permit the lens mount and hinge support to pivot relative to one another and a security ledge removably receivable in and engagable with the security slot as the lens mount and hinge support pivot relative to one another; and
   a friction element extending into the hinge receiver for exerting a friction force on the hinge post to restrict axial movement and removal of the hinge post from the hinge receiver and hold the lens mount and hinge support together.

2. The eyewear hinge of claim 1, wherein the security ledge disengages the security slot when the lens mount and hinge support are pivoted into a removal position corresponding to a discontinuity in the security ledge such that the security ledge is no longer received in or engaged with the security slot.

3. The eyewear hinge of claim 2, wherein the removal position corresponds to the lens mount and hinge support being pivoted beyond a closed position such that the security ledge is no longer received in or engaged with the security slot.

4. The eyewear hinge of claim 1, wherein the friction force exerted by the friction element restricts pivotal movement of the hinge post relative to the hinge receiver.

5. The eyewear hinge of claim 1, wherein the friction element pushes the hinge post against an inner wall of the hinge receiver.

6. The eyewear hinge of claim 1, including a port and an inner chamber defining a pathway transverse to the hinge receiver configured to receive the friction element.

7. The eyewear hinge of claim 6, wherein the friction element is disposed within the inner chamber so as to extend into the hinge receiver.

8. An eyewear hinge for removably connecting an earpiece to a lens frame, the eyewear hinge comprising:
   a hinge support attached to the earpiece, the hinge support having a hinge receiver;
   a lens mount attached to the lens frame and having a hinge post removably insertable into the hinge receiver so as to permit the lens mount and hinge support to pivot relative to one another; and
   a friction element extending into the hinge receiver for exerting a friction force on the hinge post to restrict axial movement and removal of the hinge post from the hinge receiver and hold the lens mount and hinge support together.

9. The eyewear hinge of claim 8, wherein the hinge support includes a security slot and the lens mount includes a security ledge removably receivable in and engagable with the security slot as the lens mount and hinge support pivot relative to one another.

10. The eyewear hinge of claim 9, wherein the security ledge disengages the security slot when the lens mount and hinge support are pivoted into a removal position corresponding to a discontinuity in the security ledge such that the security ledge is no longer received in or engaged with the security slot.

11. The eyewear hinge of claim 10, wherein the removal position corresponds to the lens mount and hinge support being pivoted beyond a closed position such that the security ledge is no longer received in or engaged with the security slot.

12. The eyewear hinge of claim 8, wherein the friction force exerted by the friction element restricts pivotal movement of the hinge post relative to the hinge receiver.

13. The eyewear hinge of claim 8, wherein the friction element pushes the hinge post against an inner wall of the hinge receiver.

14. The eyewear hinge of claim 8, including a port and an inner chamber defining a pathway transverse to the hinge receiver configured to receive the friction element.

15. The eyewear hinge of claim 14, wherein the friction element is disposed within the inner chamber so as to extend into the hinge receiver.

16. An eyewear hinge for removably connecting an earpiece to a lens frame, the eyewear hinge comprising:
   a lens mount attached to the lens frame and having a hinge receiver;
   a hinge support attached to the earpiece, the hinge support having a hinge post removably insertable into the hinge receiver so as to permit the lens mount and hinge support to pivot relative to one another; and
   a friction element extending into the hinge receiver for exerting a friction force on the hinge post to restrict pivotal movement of the hinge post relative to the hinge receiver and restrict axial movement and removal of the hinge post from the hinge receiver so as to hold the lens mount and hinge support together.

17. The eyewear hinge of claim 16, wherein the hinge support includes a security slot and the lens mount includes a security ledge removably receivable in and engagable with the security slot as the lens mount and hinge support pivot relative to one another.

18. The eyewear hinge of claim 17, wherein the security ledge disengages the security slot when the lens mount and hinge support are pivoted into a removal position corresponding to a discontinuity in the security ledge such that the security ledge is no longer received in or engaged with the security slot.

19. The eyewear hinge of claim 18, wherein the removal position corresponds to the lens mount and hinge support being pivoted beyond a closed position such that the security ledge is no longer received in or engaged with the security slot.

20. The eyewear hinge of claim 16, wherein the friction element pushes the hinge post against an inner wall of the hinge receiver.

21. The eyewear hinge of claim 16, including a port and an inner chamber defining a pathway transverse to the hinge receiver configured to receive the friction element.

22. The eyewear hinge of claim 21, wherein the friction element is disposed within the inner chamber so as to extend into the hinge receiver.

* * * * *